United States Patent
Cur et al.

(10) Patent No.: US 9,759,438 B2
(45) Date of Patent: *Sep. 12, 2017

(54) AIR CONDITIONER WITH SELECTIVE FILTERING FOR AIR PURIFICATION

(71) Applicant: Whirlpool Corporation, Benton Harbor, MI (US)

(72) Inventors: Nihat O. Cur, St. Joseph, MI (US); James C. L. Guarino, Kalamazoo, MI (US); James W. Kendall, Mt. Prospect, IL (US); Steven J. Kuehl, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/711,173

(22) Filed: May 13, 2015

(65) Prior Publication Data

US 2015/0354874 A1   Dec. 10, 2015

Related U.S. Application Data

(63) Continuation-in-part of application No. 14/644,510, filed on Mar. 11, 2015, which is a
(Continued)

(51) Int. Cl.
*B03C 3/12* (2006.01)
*B03C 3/36* (2006.01)
(Continued)

(52) U.S. Cl.
CPC .......... *F24F 3/1603* (2013.01); *F24F 1/0007* (2013.01); *F24F 13/28* (2013.01); *F24F 2011/0064* (2013.01); *Y10T 29/49361* (2015.01)

(58) Field of Classification Search
CPC .. B03C 3/12; B03C 3/36; B03C 3/455; B03C 3/45; B03C 2201/12; F24F 1/0007;
(Continued)

(56) References Cited

U.S. PATENT DOCUMENTS 3,139,020 A  *  6/1964  Schemenauer  .......  F24F 1/0007
165/249
3,500,738 A  *  3/1970  Wenig  ......................  F04D 25/10
392/382

(Continued)

FOREIGN PATENT DOCUMENTS

EP     2597384 A2    5/2013
JP     03036434      2/1991
(Continued)

OTHER PUBLICATIONS

International Searching Authority, "Search Report and Written Opinion," issued in connection with International Application No. PCT/US2015/035005, mailed Oct. 22, 2015, 13 pages.

*Primary Examiner* — Jacob T Minskey
*Assistant Examiner* — Minh-Chau Pham
(74) *Attorney, Agent, or Firm* — Nyemaster Goode, P.C.

(57) ABSTRACT

A split air conditioner has a cabinet with a fan and evaporator for mounting within a structure. The cabinet includes one or more movable dampers or movable filters positioned in the flow path between the air inlet and the outlet for selectively filtering contaminants from the air to provide a greater or lesser degree of filtration of the air. The movable filters include sliding and/or pivot mounting structure which may accommodate stacking multiple filters with different filtering characteristics. The system may operate in a filtering only mode with no cooling, a cooling only mode with no filtering, or a combination of cooling and selective filtering.

34 Claims, 27 Drawing Sheets

Related U.S. Application Data continuation-in-part of application No. 14/644,553, filed on Mar. 11, 2015, which is a continuation-in-part of application No. 14/580,736, filed on Dec. 23, 2014.

(60) Provisional application No. 62/010,088, filed on Jun. 10, 2014, provisional application No. 62/064,181, filed on Oct. 15, 2014.

(51) Int. Cl.
  *B03C 3/45* (2006.01)
  *F24F 3/16* (2006.01)
  *F24F 13/28* (2006.01)
  *F24F 1/00* (2011.01)
  *F24F 11/00* (2006.01)

(58) Field of Classification Search
  CPC .............. F24F 3/166; F24F 2001/0096; F24F 2003/1639; F24F 2001/0048; Y10S 55/10
  USPC ...... 55/385.3, DIG. 10; 96/28, 74, 399–407; 95/73, 74
  See application file for complete search history.

(56) References Cited

U.S. PATENT DOCUMENTS

| | | | |
|---|---|---|---|
| 3,618,659 A * | 11/1971 | Rawal | F24F 3/044 165/104.34 |
| 4,505,129 A | 3/1985 | Yamane et al. | |
| 4,538,425 A | 9/1985 | Ohishi et al. | |
| 6,129,781 A * | 10/2000 | Okamoto | B03C 3/12 55/282.3 |
| 6,913,637 B2 | 7/2005 | Kim | |
| 7,266,971 B2 | 9/2007 | Kang | |
| 7,350,371 B2 | 4/2008 | Lee et al. | |
| 2005/0284168 A1* | 12/2005 | Lee | F24F 1/0007 62/317 |
| 2009/0032216 A1* | 2/2009 | Kim | B60H 1/00064 165/63 |
| 2010/0043362 A1* | 2/2010 | Okada | F24F 1/0007 55/296 |
| 2012/0137876 A1* | 6/2012 | Miller | B01D 46/0043 95/23 |
| 2013/0074459 A1* | 3/2013 | Kuwada | B01D 46/42 55/385.3 |

FOREIGN PATENT DOCUMENTS

| | | |
|---|---|---|
| JP | 11-276835 | 10/1999 |
| JP | 2000018646 A | 1/2000 |
| JP | 2005180768 A | 7/2005 |
| JP | 2005315531 | 11/2005 |
| JP | 2006002985 A | 1/2006 |
| KR | 0100176907 B1 | 10/1999 |
| KR | 20000046491 A | 7/2000 |
| KR | 1020050058136 A | 6/2005 |
| KR | 100626433 | 9/2006 |

* cited by examiner

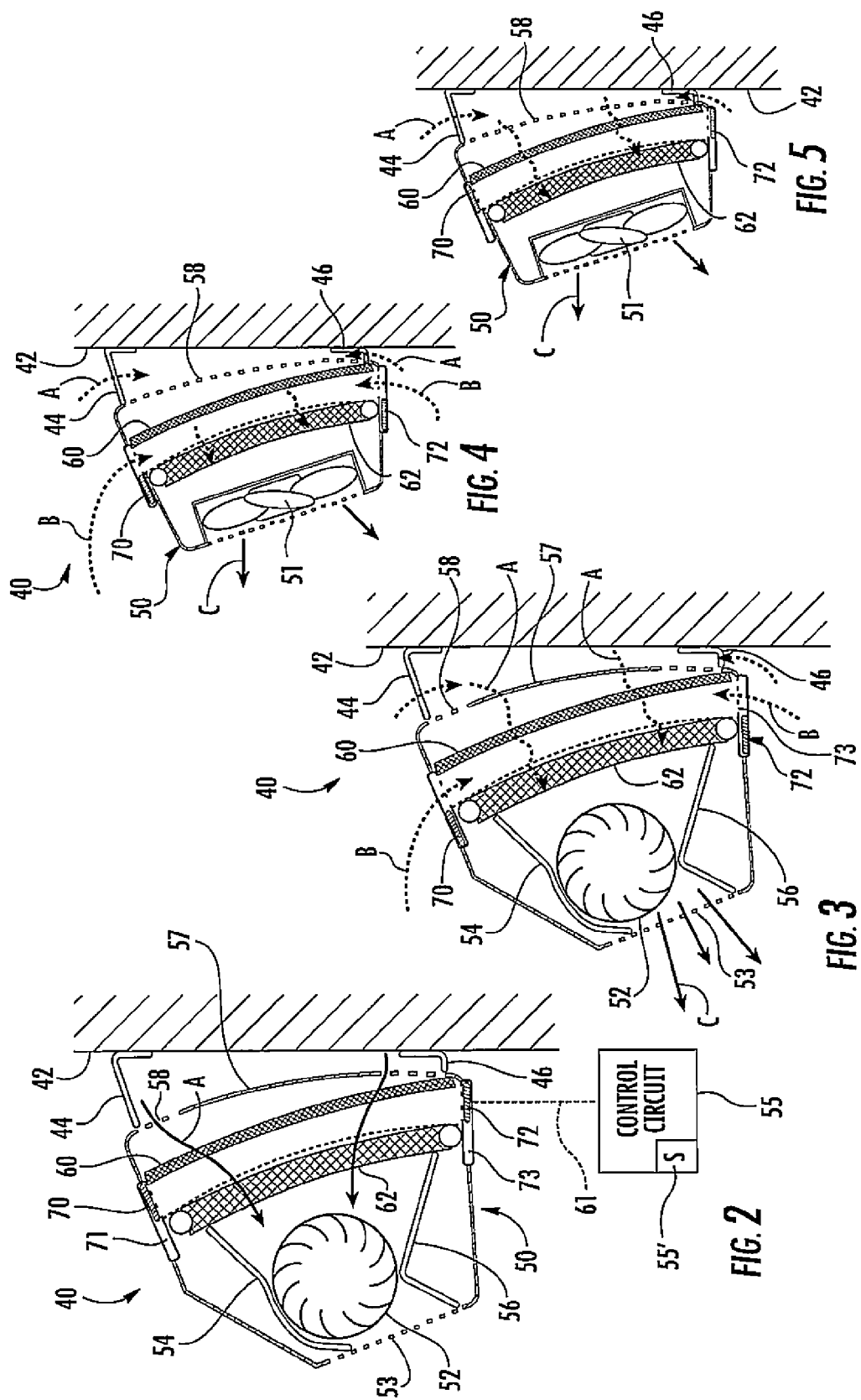

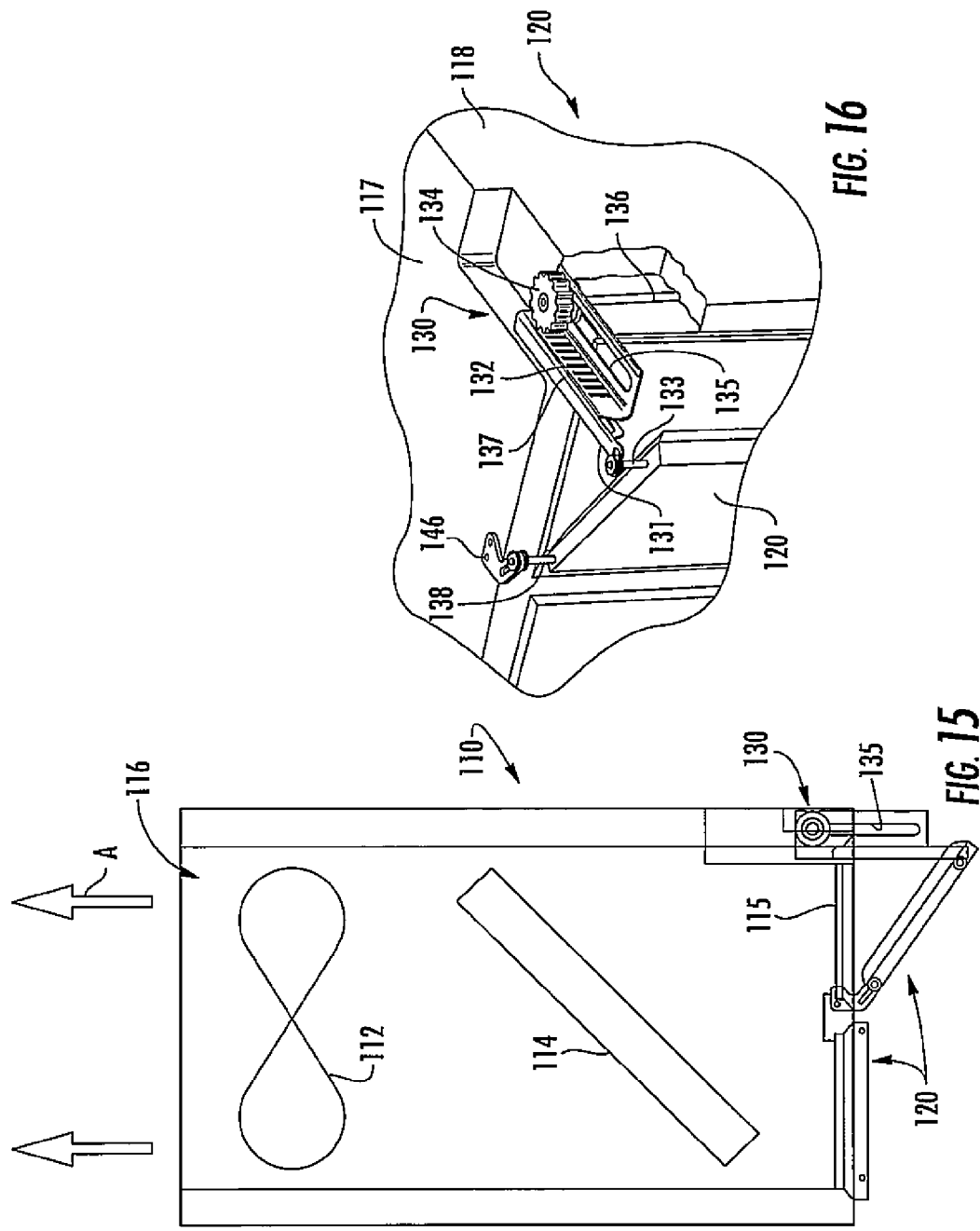

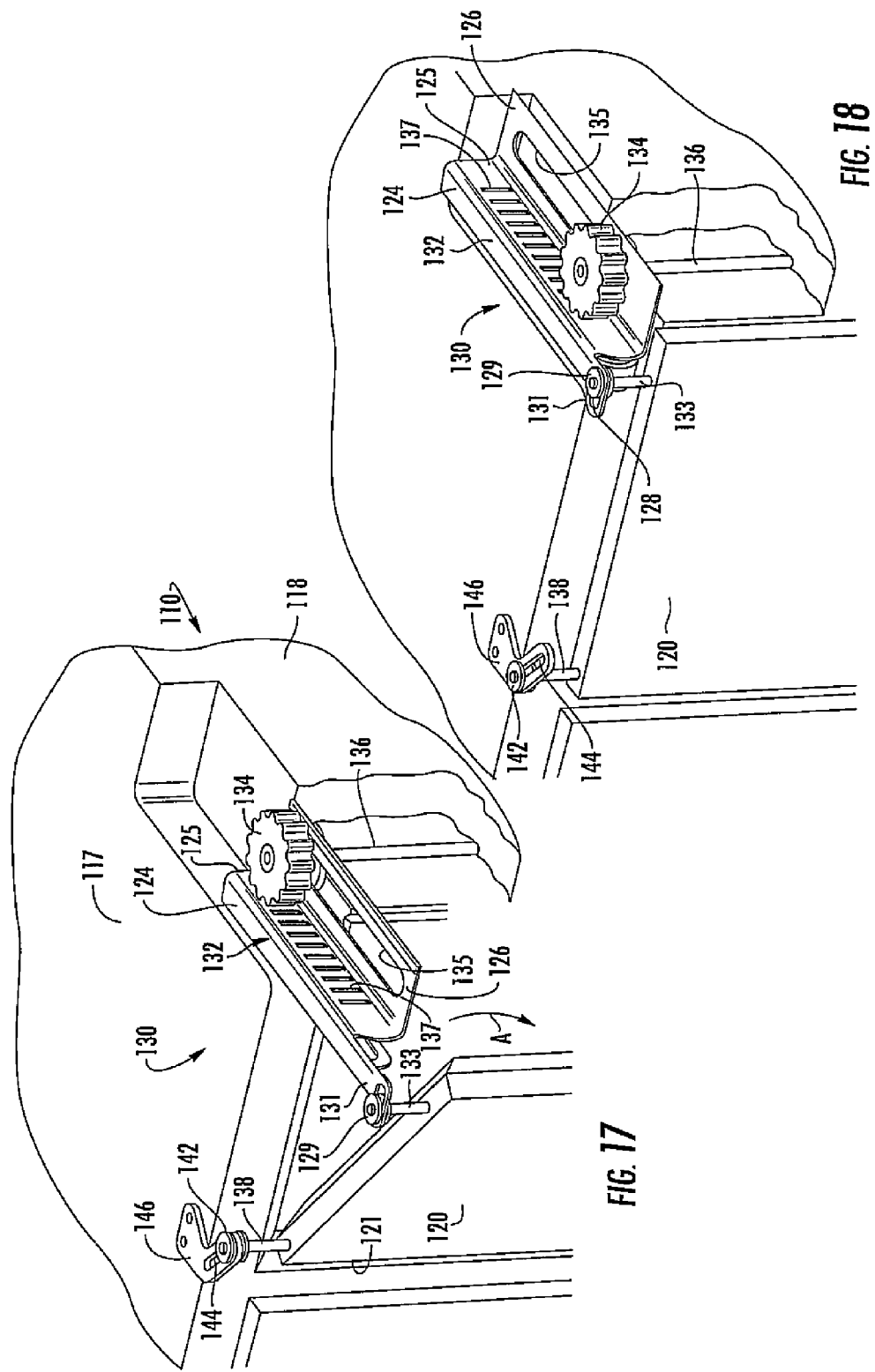

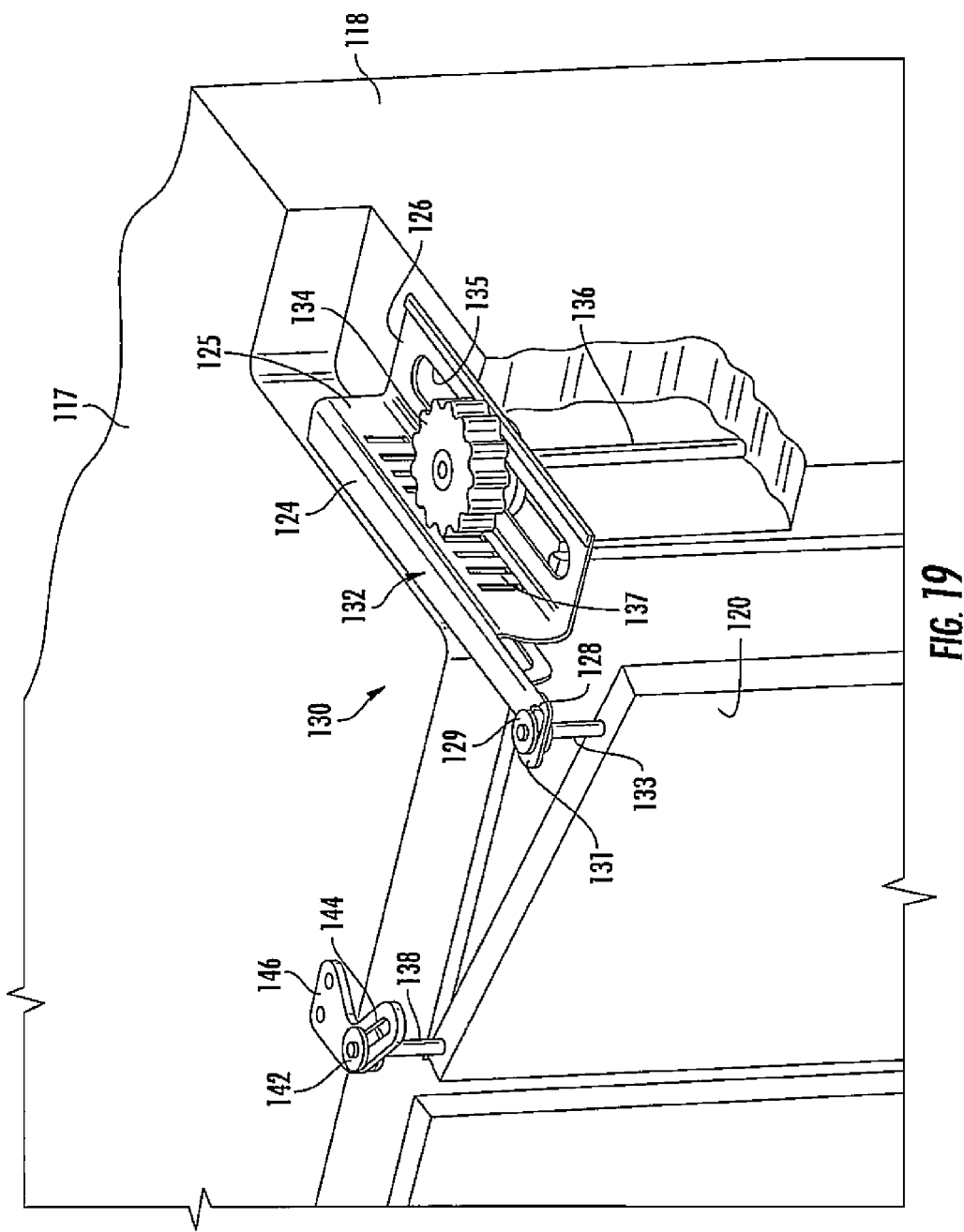

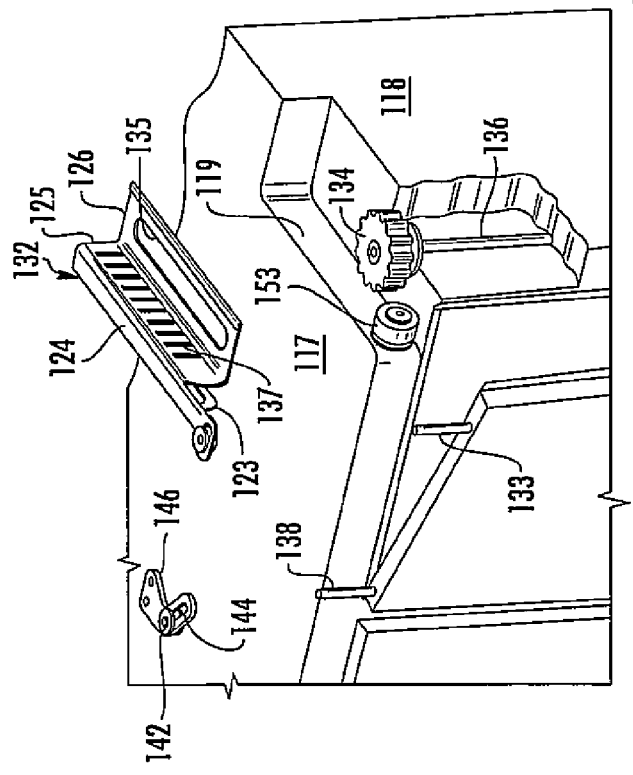
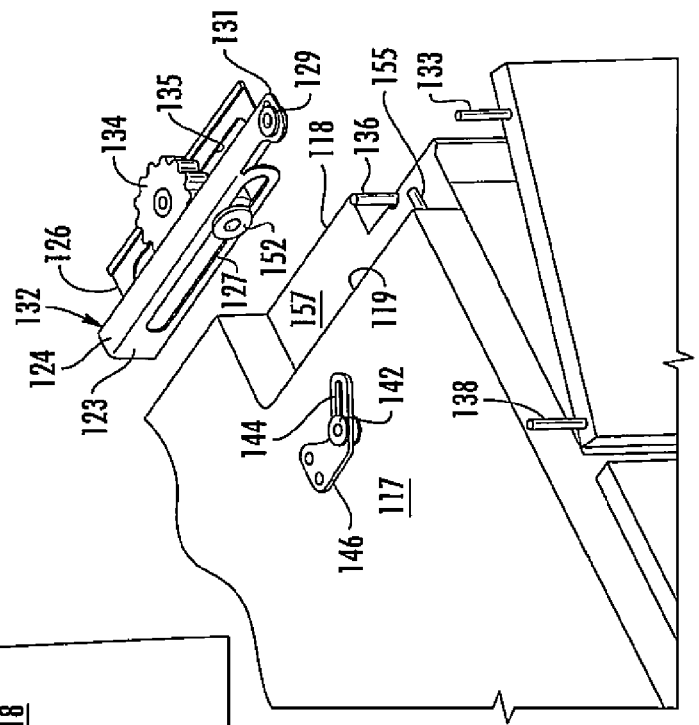
FIG. 20
FIG. 21

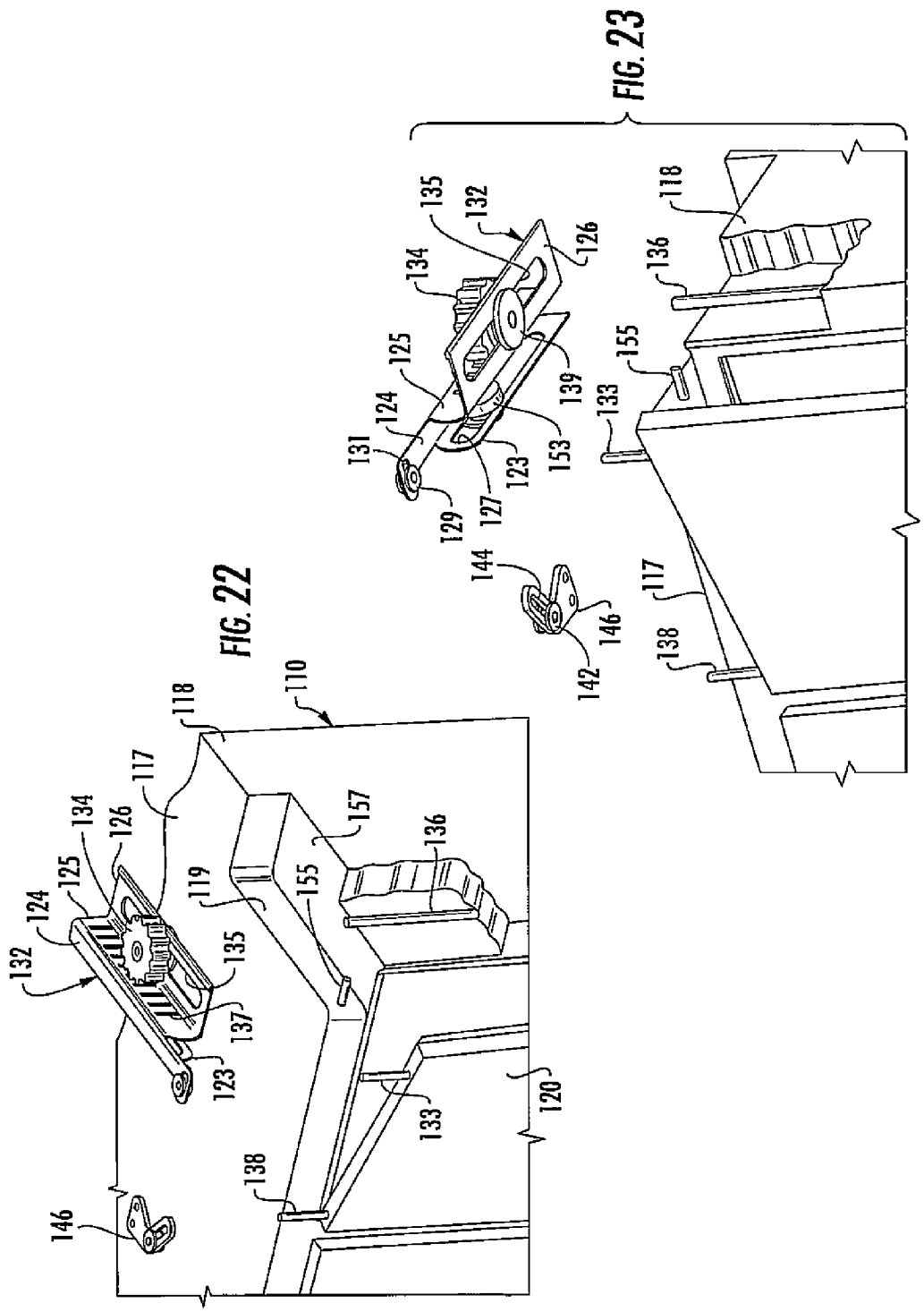

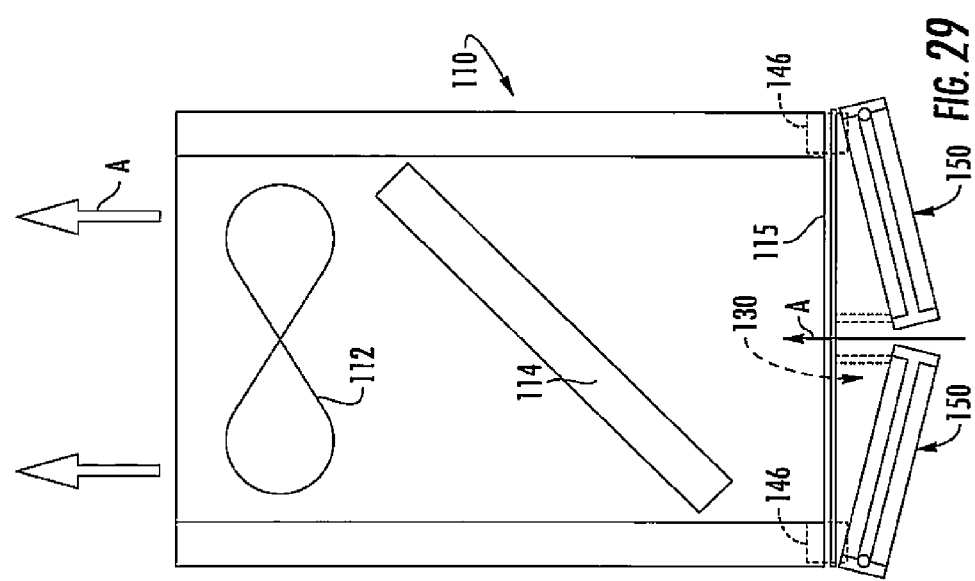
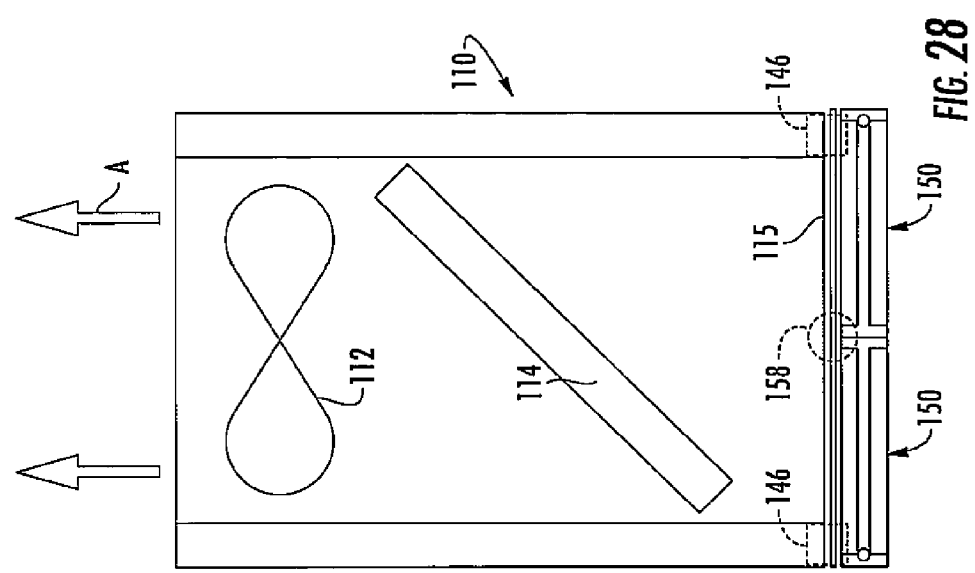

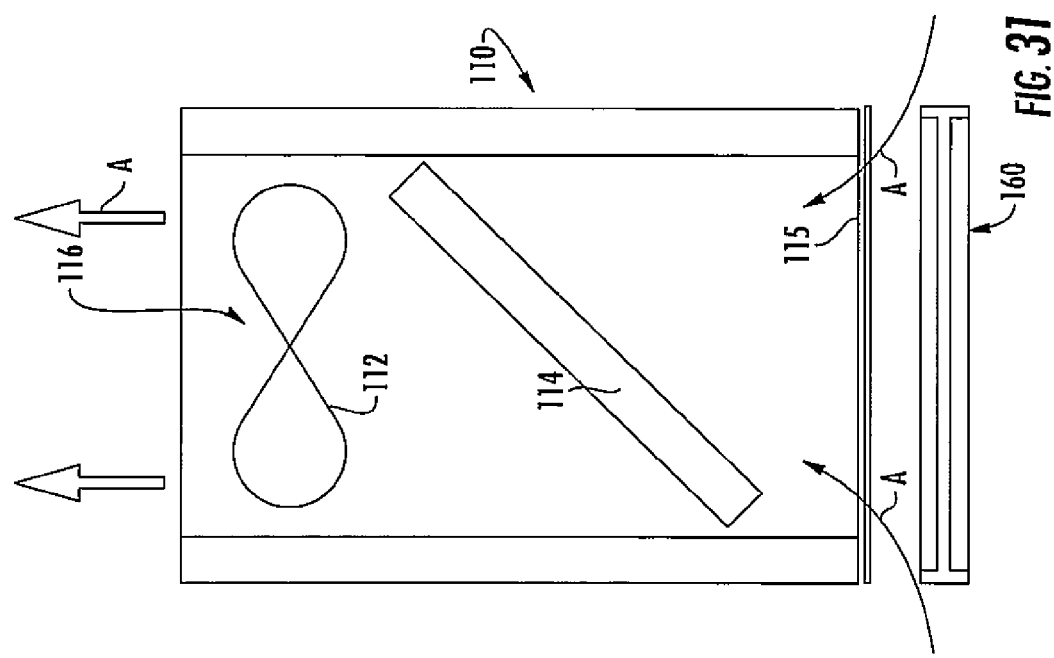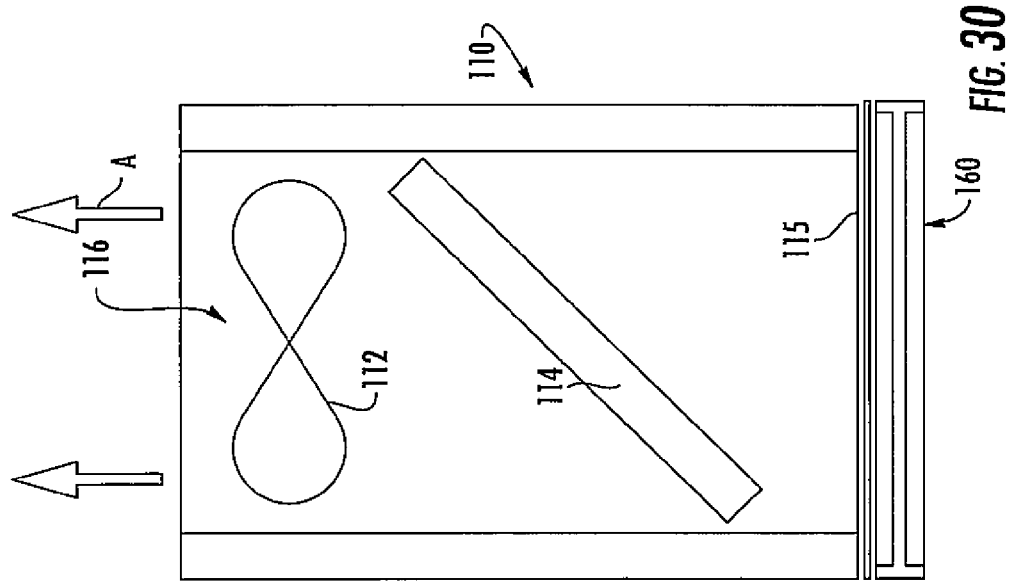

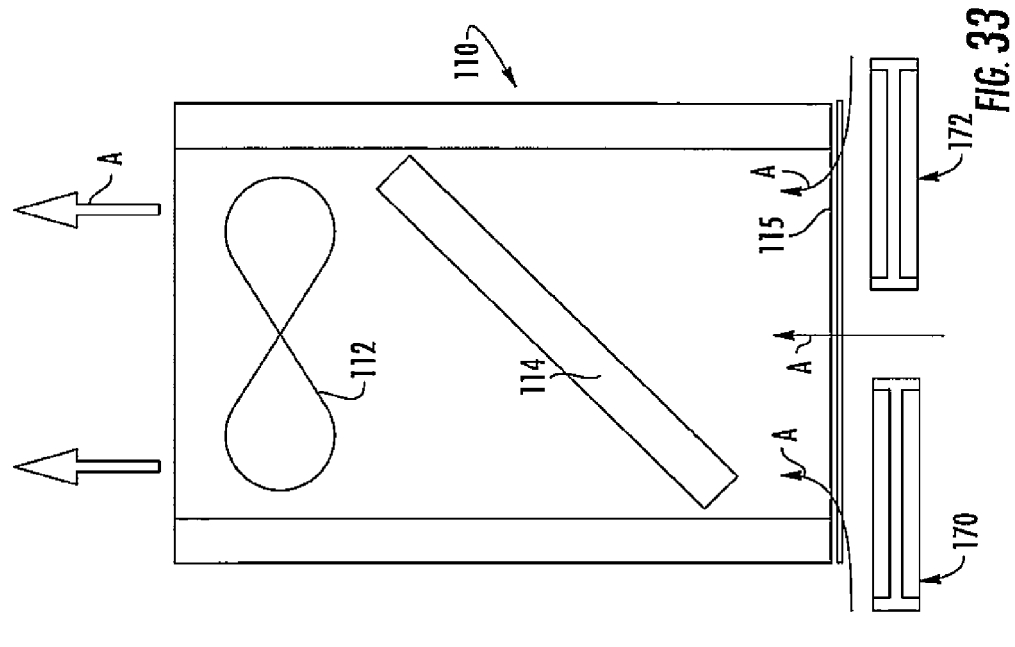
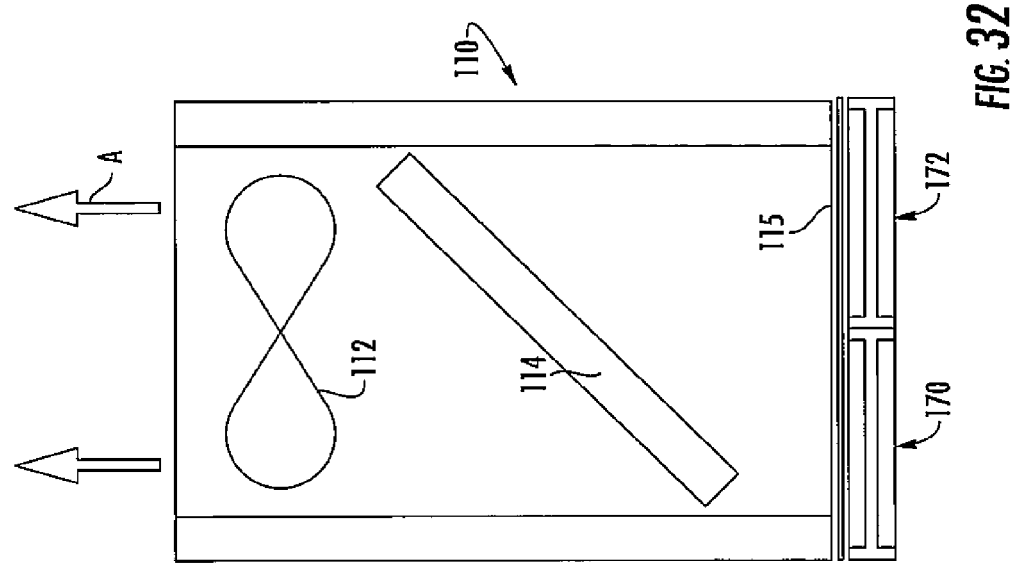

AIR CONDITIONER WITH SELECTIVE FILTERING FOR AIR PURIFICATION

CROSS-REFERENCE TO RELATED APPLICATIONS

This application is a continuation-in-part of U.S. application Ser. No. 14/644,510 entitled AIR CONDITIONER WITH SELECTIVE FILTERING FOR AIR PURIFICATION, filed on Mar. 11, 2015, which claims priority under 35 U.S.C. §119(e) and the benefit of U.S. Provisional Application No. 62/010,088 entitled SPLIT SYSTEM OUTDOOR AIR UNIT, filed on Jun. 10, 2014, and 62/064,181 entitled SPLIT SYSTEM AIR CONDITIONER/HEAT PUMP WITH DUAL HUB FAN CONDENSING UNIT AND ENHANCED COMPRESSOR COOLING, filed on Oct. 15, 2014. This application is also a continuation-in-part of U.S. application Ser. No. 14/644,553 entitled AIR CONDITIONER WITH SELECTIVE FILTERING FOR AIR PURIFICATION, filed on Mar. 11, 2015, which claims priority under 35 U.S.C. §119(e) and the benefit of U.S. Provisional Application Nos. 62/010,088 entitled SPLIT SYSTEM OUTDOOR AIR UNIT, filed on Jun. 10, 2014, and 62/064,181 entitled SPLIT SYSTEM AIR CONDITIONER/HEAT PUMP WITH DUAL HUB FAN CONDENSING UNIT AND ENHANCED COMPRESSOR COOLING, filed on Oct. 15, 2014. This application is also a continuation-in-part of U.S. application Ser. No. 14/580,736 entitled AIR CONDITIONER WITH SELECTABLE SUPPLEMENTAL COMPRESSOR COOLING, filed Dec. 23, 2014, which claims priority under 35 U.S.C. §119(e) and the benefit of U.S. Provisional Application Nos. 62/010,088 entitled SPLIT SYSTEM OUTDOOR AIR UNIT, filed on Jun. 10, 2014, and 62/064,181 entitled SPLIT SYSTEM AIR CONDITIONER/HEAT PUMP WITH DUAL HUB FAN CONDENSING UNIT AND ENHANCED COMPRESSOR COOLING, filed on Oct. 15, 2014. The entire disclosures of which are incorporated herein by reference.

BACKGROUND OF THE INVENTION

The present invention relates to a split system air conditioning or heat pump system in which an evaporator component is positioned within a structure and is coupled to an external compressor/condenser unit and particularly to a cabinet enclosure for an evaporator which includes supplemental air filtration which can be selectively controlled by the user.

Split air conditioners are becoming popular for the use in individual areas of buildings, such as a bedroom or living room, where central air conditioning with universal duct work is either not available or unnecessary for living comfort. Split air conditioners typically include a wall-mounted or freestanding indoor unit which includes an evaporator and a fan for cooling and dehumidifying air within a room. The indoor unit is coupled to an outdoor compressor/condenser unit for dissipating heat from the typically wall-mounted system. Such systems provide cooling frequently for a single room or multiple rooms, however, they do not provide substantial air purification by filtering or the like other than a simple screen filter which is not effective for removal of most pollutants.

Accordingly, it would be desirable to provide a split air conditioner system in which air filtering can also be achieved and controlled by the user to provide a selectable amount of air filtration depending upon, for example, seasonal allergies to pollen or other allergens which may be present in the air and which it is desired to be filtered utilizing a split air conditioning system.

SUMMARY OF THE INVENTION

The system of the present invention accommodates this need by providing an air conditioner/heat pump having a cabinet for mounting or resting on an indoor surface of a building structure. The cabinet includes a fan and an evaporator with an inlet for drawing untreated air into the cabinet, on one side of the evaporator, and an air outlet on the opposite side of the evaporator to provide conditioned air output from the cabinet.

In a preferred embodiment of the invention, the cabinet includes one or more movable dampers or movable filters positioned in the flow path between the air inlet and the outlet for selectively filtering contaminants from the air to provide a greater or lesser degree of filtration of the air. The movable filters include sliding and/or pivot mounting structure which may accommodate stacking multiple filters with different filtering characteristics. The system may operate in a filtering only mode with no cooling or heating, a cooling or heating only mode with no filtering, or a combination of cooling/heating and selective filtering.

In another aspect of the invention, the indoor unit air intake is primarily or wholly from the louvers located at the bottom section of the indoor unit instead of from the louvers located on the upper section of the indoor unit as in conventional split air conditioners. Intaking air from the lower portion of the space to be cooled has real energy use saving benefits since the warm air close to the ceiling of the space being cooled is left mostly undisturbed and focus is upon cooling the air where the occupants are located.

These and other features, objects and advantages of the present invention will become apparent upon reading the following description thereof together with reference to the accompanying drawings.

BRIEF DESCRIPTION OF THE DRAWINGS

FIGS. 2-7 are cross-sectional schematic views of air conditioning units with selective dampers for selectively controlling the airflow through a filter in the air conditioning unit;

FIGS. 15-25 illustrate top, perspective, and fragmentary exploded views of a filter system in which the filters can be pivotally moved between operational positions where maximum filtering takes place to bypass positions in which a selectable amount of filtering is available;

FIGS. 28 and 29 are top schematic views illustrating another embodiment in which filters pivot on a vertical axis on outside edges of an air conditioning cabinet;

FIGS. 30 and 31 schematically illustrate in a top plan view a sliding filter where, in FIG. 30, the filter is fully engaged for maximum filtration and, in FIG. 31, the filter is moved away from the air conditioner cabinet to allow filtered and unfiltered air to enter the cabinet for increased cooling;

FIGS. 32 and 33 illustrate an alternative embodiment in a top plan and schematic view of a filter construction in which two filters both move away from the air conditioner cabinet and away from each other, as illustrated in FIG. 33, to allow filtered and unfiltered air to enter the cabinet;

DETAILED DESCRIPTION OF THE PREFERRED EMBODIMENT

Figure 1:
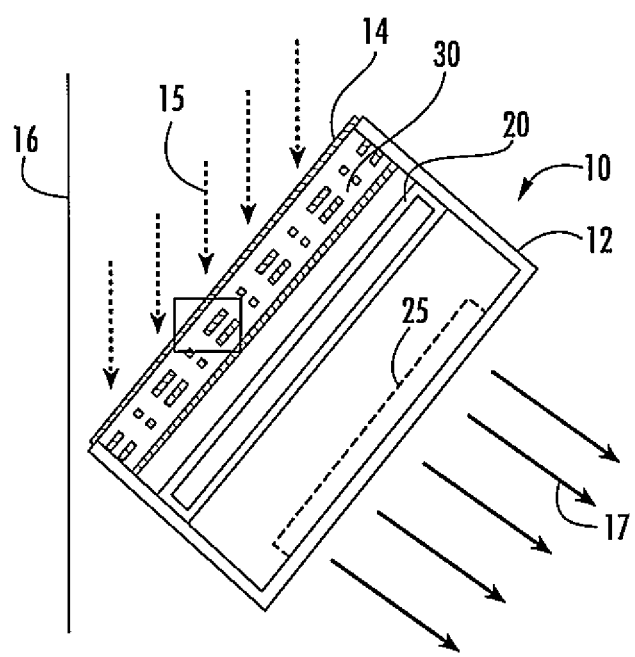
FIG. 1 is a schematic cross-sectional view of an air conditioning unit of the present invention, shown mounted in relationship to a wall for providing filtered and conditioned air to a living space.
Figure 1A:
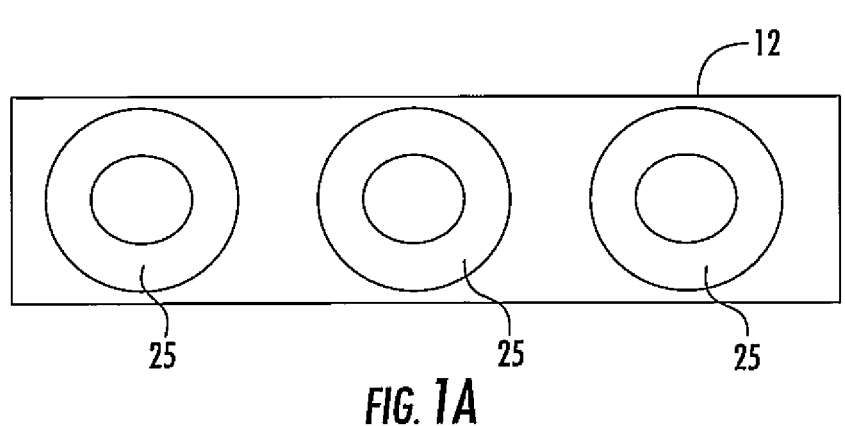
FIG. 1A is a front elevational view of the cabinet shown in FIG. 1.

Referring initially to FIGS. 1 and 1A, they illustrate one embodiment of the present invention, in which a split air conditioning system includes an indoor air conditioner unit 10 with a cabinet 12, which has a rear air inlet grill 14 for receiving inlet air to be conditioned, as shown by arrows 15. As used herein, air conditioning is intended to encompass both cooling of air or, in a heat pump installation, either cooling or heating of air with an indoor evaporator. The cabinet 12 is typically mounted to a support wall 16 of a building structure using suitable brackets. In floor-mounted installations, it will rest on the floor of a room. Within cabinet 12, there is positioned a micro channel or a fin-and-tube type heat exchanger which is a flat evaporator 20 conventionally coupled to an outside compressor/condenser unit for receiving a high pressure refrigerant liquid through a capillary tube or expansion valve fluidically coupled to the evaporator for cooling the input air 15 flowing through the air conditioner cabinet 12. As one possible illustration, three muffin-type fans 25 are mounted to the front of the cabinet 12 facing the interior of the room for exhausting treated air in the direction indicated by arrows 17. The cabinet further includes a filter unit 30 positioned between the inlet grill 14 and the evaporator 20 for purifying the air from contaminants, such as pollen, dust, and the like. In this embodiment of the invention, all of the input air 15 is not only conditioned for cooling and removing humidity but also filtered by the filter 30, which can provide close to HEPA-like performance but without the substantial pressure drop associated with HEPA filters. An example of such a filter could be 3M's HAF filter with ionizer, or a stacked filter combination with multiple filters for various pollutants such as viruses, hydrocarbons or other volatile organic compounds (VOC's), heavy metals, requiring filtration by activated charcoal or like, or Darwin's ifD® technology, etc. Filters in the system can be stacked in different combinations to create performance characteristics. Carbon, high airflow, HEPA, dust filters can be used in the airflow depending on the air characteristics needed.

In each of the embodiments described, the evaporator unit is coupled to the outside compressor/condenser utilizing conventional refrigerant fluid conduits for interconnecting the units. Similarly, the indoor evaporator system may include a drain for removing condensate that may have been collected during the cooling process. Additionally, a standard gross particle filter covers the air inlet side of the evaporator at all times during operation. In all embodiments of the invention where a damper and/or a filter is moved by some form of motor or actuator, a control circuit is provided. The circuit can be operator actuated to select a desired temperature or the desired amount of filtering (such as 50%) or by a sensor which may be incorporated into an operator actuated remote control typically located in the room area being conditioned. Any number of commercially available hydrocarbon and/or particulate matter sensors can be employed as input signals to a microprocessor circuit programmed to respond to operator inputs and/or sensor inputs and/or time. In response, the microprocessor provides output control signals to drive circuits to actuate the damper or filter moving motors or actuators and the compressor in a conventional manner. One such circuit is shown in block form as 55, 55' in FIG. 2. It is to be understood that all of the embodiments of this invention will include such a control circuit. The circuit can be programmed to activate full filtering with the fan running and the compressor in the off condition. The schematic drawings illustrate the mounting of the indoor cabinet to structural walls, although the units can likewise be attached to the ceiling of a building in a conventional manner, or may be of a floor standing type.

Turning now to FIGS. 2 and 3, there is shown the indoor air conditioning unit 40 of a split system. Unit 40 is mounted to the wall 42 of a building utilizing conventional upper and lower mounting brackets 44 and 46. Unit 40 includes a cabinet 50 which typically will be an elongated rectangular cabinet similar to cabinet 12 shown in FIG. 1A. In the embodiment shown in FIGS. 2 and 3, however, an elongated cross-flow fan 52 is employed and is surrounded by upper and lower baffles 54 and 56 to funnel incoming air through an air inlet grill 58 through a filter or a filter 60 and the evaporator 62 in a direction indicated by arrows A in FIGS. 2 and 3. The fan discharges the conditioned and filtered air outwardly through outlet grill 53 adjacent the fan 52. The cabinet 50 includes movable guillotine-type dampers 70 and 72 slideably mounted within the cabinet and movable between the closed position shown in FIG. 2 and an open position as shown in FIG. 3. In the open position, supplemental air (indicated by arrows B in FIG. 3) can enter the cabinet 50 on the downstream side of filter 60, thereby bypassing the filter 60 to some extent. The guillotine dampers 70, 72 slideably fit along channels 71, 73 (FIG. 2) in cabinet 50 to selectively block or allow air in the direction of arrows B to bypass filter 60 and flow directly through the evaporator 62 depending upon the need for filtering incoming air, shown by arrows A in FIGS. 2 and 3. For such purpose, the mounting brackets 44, 46 provide clearance for the input grill 58 in the back wall 57 of cabinet 50 to allow input airflow which flows through filter 60 in both the FIGS. 2 and 3 configurations, although in the FIG. 3 configuration, less of the air is filtered. The dampers 70, 72 can be moved to positions intermediate that shown in FIGS. 2 and 3 to selectively control the amount of air that is filtered as desired. The exit air shown by arrows C in FIG. 3 represents the conditioned and filtered air drawn through the unit by fan 52. The dampers are controlled by a control circuit 55 including a hydrocarbon and/or particulate sensor 55', as discussed above. The dashed line in FIG. 2 represents the mechanical coupling of an actuator 61 for the damper which is coupled to and controlled by circuit 55.

FIGS. 4 and 5 have the same configuration as the units shown in FIGS. 2 and 3 except aligned muffin-type fans 51, such as shown in FIG. 1A, are employed as opposed to an elongated cross-flow fan 52. The remaining components of the FIGS. 4 and 5 embodiment are the same and use the same reference numbers.

Figure 6:
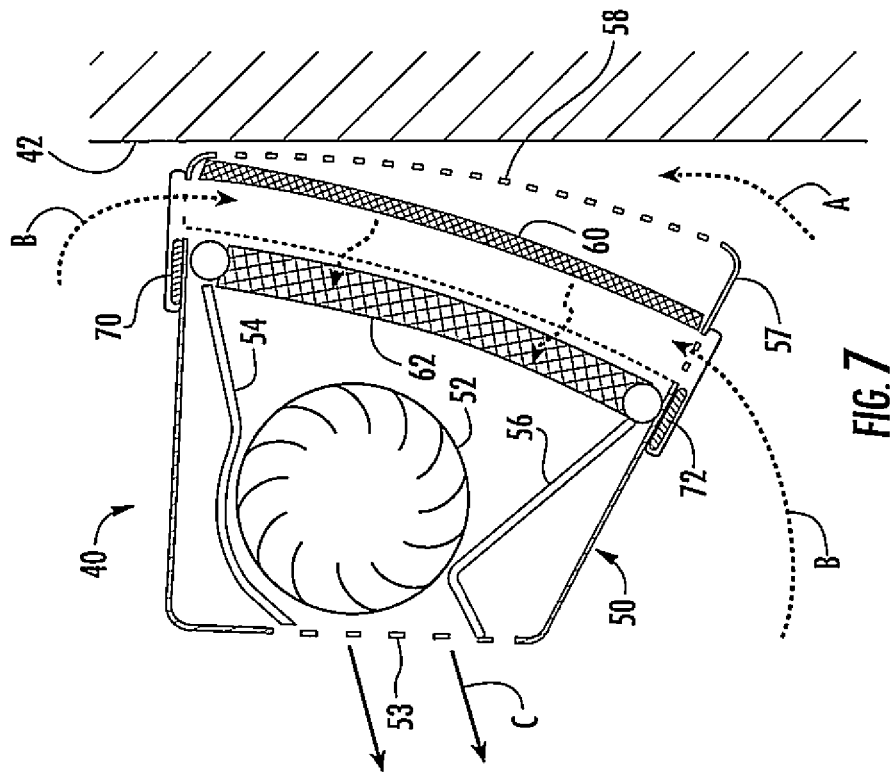
Figure 7:
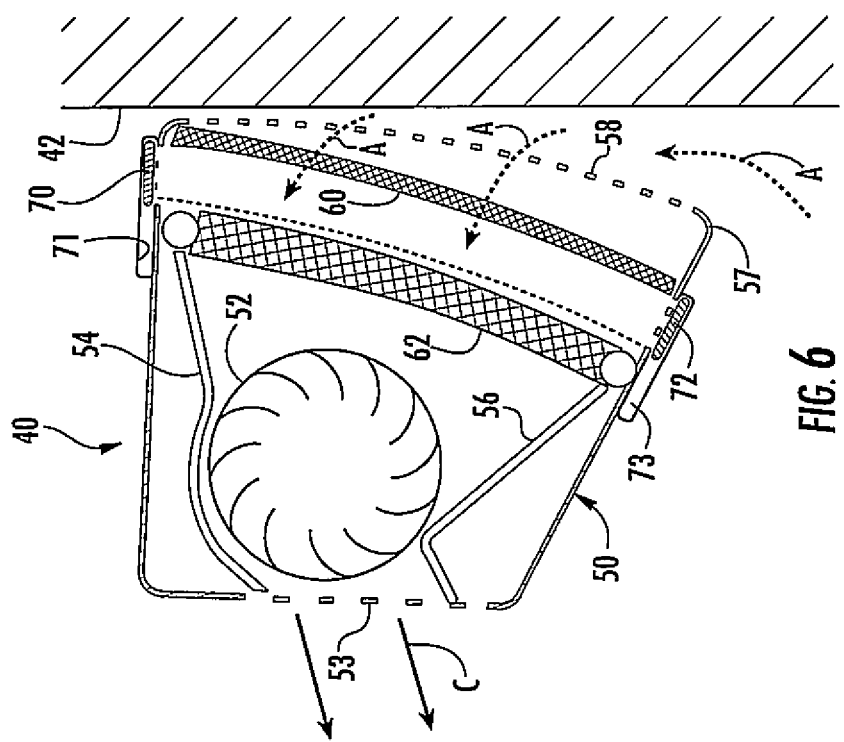

FIGS. 6 and 7 show a unit 40 of the same general construction as the FIGS. 2 and 3 embodiment but mounted to receive air from below the unit 40 as opposed to from above as shown in FIGS. 2 and 3. Thus, the incoming air, represented by arrows A in FIG. 7, enters from the lower side of the unit 40, which carries the same reference numbers as the FIGS. 2 and 3 embodiment.

Figure 10:
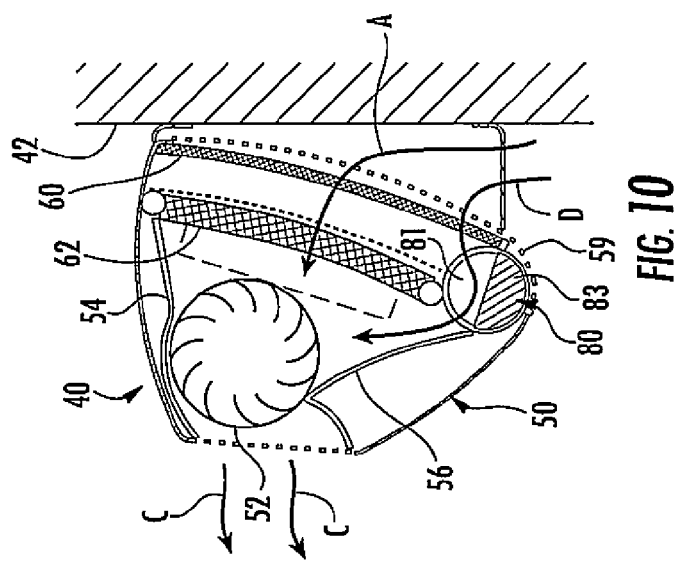
FIGS. 8-10 are cross-sectional schematic views of an air conditioning unit employing a rotary damper for selectively controlling the airflow through a filter contained by the unit.
Figure 9:
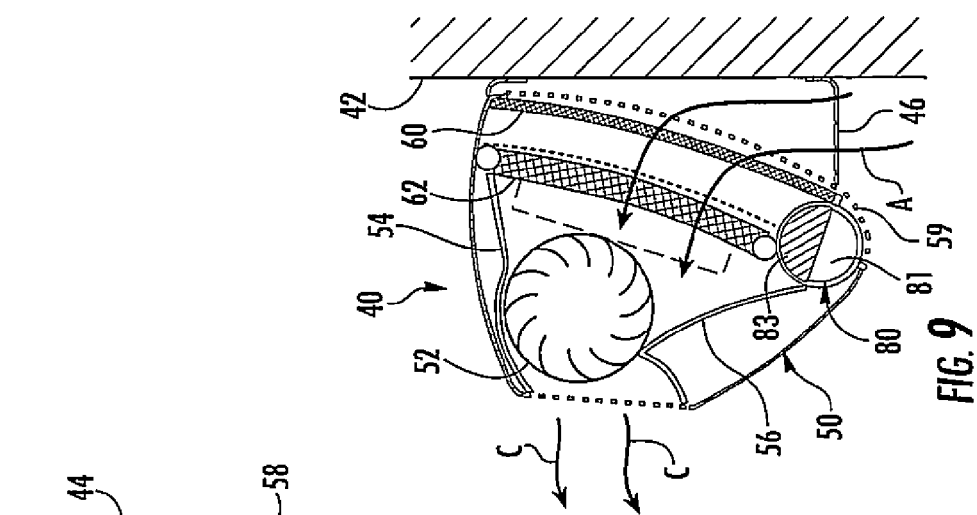
Figure 8:
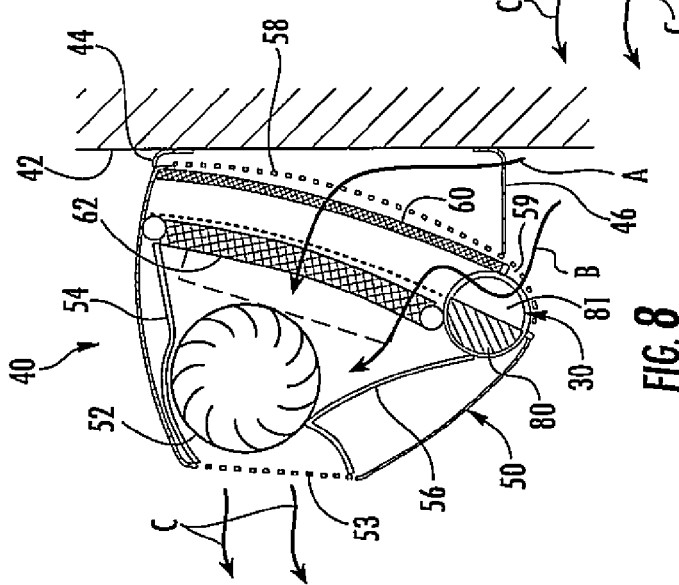
Figure 11:
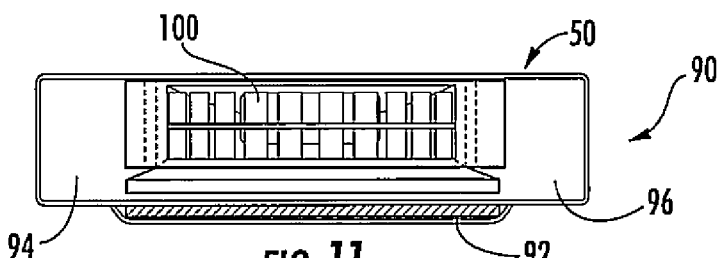
FIGS. 11-14 are top and front elevational views of alternative embodiments of the invention, where air is exhausted through spaced-apart air outlets on opposite edges of the cabinet.
Figure 12:
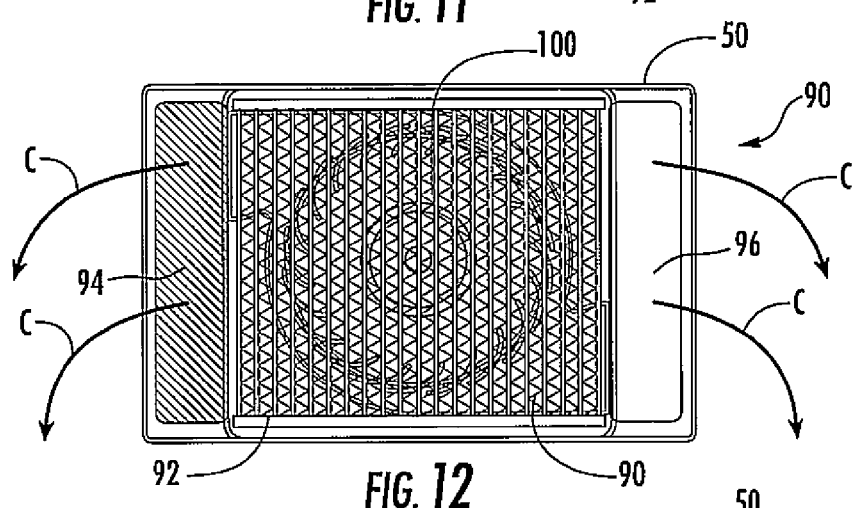

FIGS. 8-10 disclose another embodiment of the present invention in which a rotary damper 80 can be moved between three separate positions providing partially filtered air (FIG. 8), completely filtered air (FIG. 9), and filtered air which is not cooled by the evaporator (FIG. 10). Referring initially to FIG. 8, those components similar to the components shown in the previous figures employ the same reference numbers. In FIG. 8, the rotary damper 80 is mounted to the lower end 59 of an air inlet 58 in sealed rotatable engagement with the lower part of cabinet 50 and baffle 56. The damper 80 has an open pathway at section 81. Side 83 of the damper is enclosed and blocks airflow. In the position shown in FIG. 8, incoming air (shown as arrow A) enters through inlet grill 58 and flows through the filter 60 and evaporator 62 and is discharged, as indicated by arrow C, as cooled air. Additional air, shown by arrow B, flows through the open pathway 81 of damper 80 bypassing the filter 60 but flowing through the evaporator 62 and then combines to form the mixed filtered and cooled output air indicated by arrows C.

In FIG. 9, the damper 80 is rotated clockwise about 90° and, in connection with baffle 56, closes off the flow of air from inlet 59 through the damper 80. In this position, all the incoming air A flows both through the filter 60 and the evaporator 62, and none of the air bypasses the filter.

In FIG. 10, the damper is moved to a position rotated approximately 180° from that shown in FIG. 9. A new pathway, shown by arrows D, for the flow of air through the open section 81 of damper 80 bypasses the evaporator 62 completely but only after it has been filtered by filter 60. The remaining input air indicated by arrow A passes through both the filter 60 and evaporator 62 and combines with the unchilled air, shown by arrow D, exiting as shown by arrow C, as partially chilled but entirely filtered air. Thus, with the embodiment shown in FIGS. 8-10, three different modes of operation are possible. In any mode, the cooling function may be in an off condition so that only air circulation and filtration occurs.

In another embodiment of the invention shown in FIGS. 11-14, there is an indoor air conditioning unit 90 which can have a filter and baffle construction as in the prior embodiments to selectively filter the discharge air. In this embodiment, the inlet grill 92 receives air drawn through a filter and an evaporator into the center of centrifugal fan 100. The unit 90 has a pair of vertically extending rectangular outlet ports 94 and 96 on opposite sides of the cabinet 50. Conditioned and/or selectively filtered air is, therefore, distributed on opposite sides of the centrifugal fan 100, as illustrated by arrows C.

Figure 13:
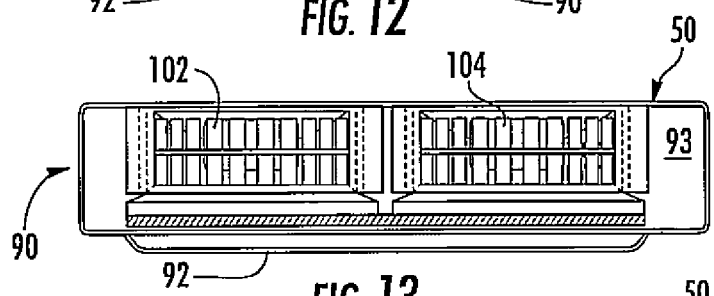
Figure 14:
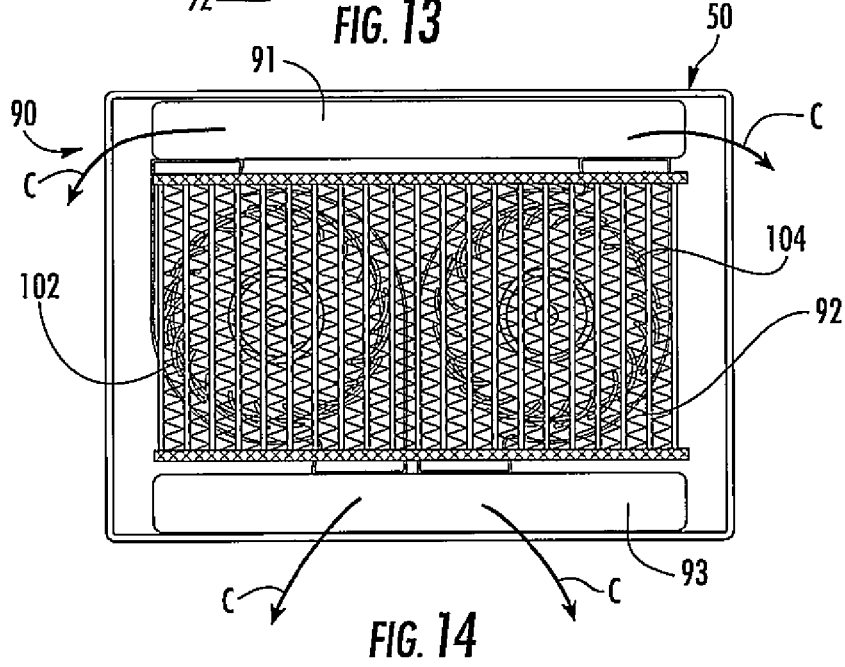

In the embodiment shown in FIGS. 13 and 14, a pair of spaced-apart centrifugal fans 102, 104 are employed to draw air into the cabinet through inlet grill 92. A pair of rectangular horizontally extending outlet ports 91 and 93 at the top and bottom of the cabinet 50 are near opposed edges of the cabinet, and the conditioned and selectively filtered air is exhausted, as shown by arrows C through outlet ports 91 and 93. The fans shown in FIG. 14 are configured to only discharge through port 93 but could be configured to discharge through port 91 or both ports with each fan discharging to one of the respective ports. In these specific embodiments, the presence of a centrifugal fan with higher pressure capabilities may allow the usage of higher pressure drop filter media which can come close to HEPA filter performance.

The FIGS. 15-25 embodiment of the invention provides a cabinet enclosure 110 for housing a fan 112 and an evaporator 114 with an air outlet 116 from the cabinet 110. The cabinet includes a standard gross particle filter 115 and a pair of movable filter assemblies 120 with the right-side filter assembly shown in detail, it being understood that the left-side filter assembly is substantially identical only with the parts reversed. The filter assemblies 120, as best seen in FIGS. 15-25, include a rack and pinion drive mechanism 130 including a sliding rack 132 movably supported on the cabinet walls 117 and 118 by the structure, as best seen in FIGS. 20-25. The rack 132 is driven by a meshing pinion gear 134 which engages the teeth 137 of the rack 132. Gear 134 is rotatably driven by a vertically extending drive shaft 136 coupled to a suitable drive motor. The end 131 of rack 132 is pivotally coupled by a roller follower 129 (FIGS. 17-19) which rides in a slot 128 in the end 131 of rack 132. Follower 129 is coupled to a pin 133 on filter 120 to allow pin 133 and follower 129 to ride in slot 128 as the filter 120 is moved, as best seen in FIGS. 17 and 18. The filter 120 can be the same type described above, namely, a 3M HAF filter. The filter 120 has the shape of a generally rectangular door-like panel with an edge opposite pivot pin 133 pivotally mounted to cabinet 110 at the top and bottom (only the top is shown, the bottom structure is substantially the same). The pivot connection to cabinet 110 includes a sliding pivot connection including a pin 138 which, as best seen in FIGS. 17 and 18, has a roller follower 142 that slides in a slot 144 of a bracket 146 secured to the upper wall 117 of cabinet enclosure 110.

The rack 132 includes a slot 135 which rides under the pinion gear 134 and is guided by a suitable bushing 139 (FIG. 23) mounted to drive shaft 136, such that, as seen in FIG. 18, when the drive gear of the pinion 134 rotates in a counterclockwise direction (as viewed from the top), the filter 120 is urged toward the open position shown in FIG. 17 by the pivot connection of the end of rack 132 to pivot pin 133 and pivot pin 138. As the door-like filter panel 120 moves to an open position, the pivot pin 138 slides within the slot 144 of bracket 146 to extend the inward edge 121 of panel 120 to an outward position clearing the cabinet enclosure 110 and allowing air to bypass the filter panel 120 and move in the direction indicated by arrow A in FIG. 17. Additional exploded fragmentary view of the components, including the bushings and roller guides for the rack and pinion assembly 130, are shown in the detailed fragmentary exploded perspective views of FIGS. 20-25.

Figure 25:
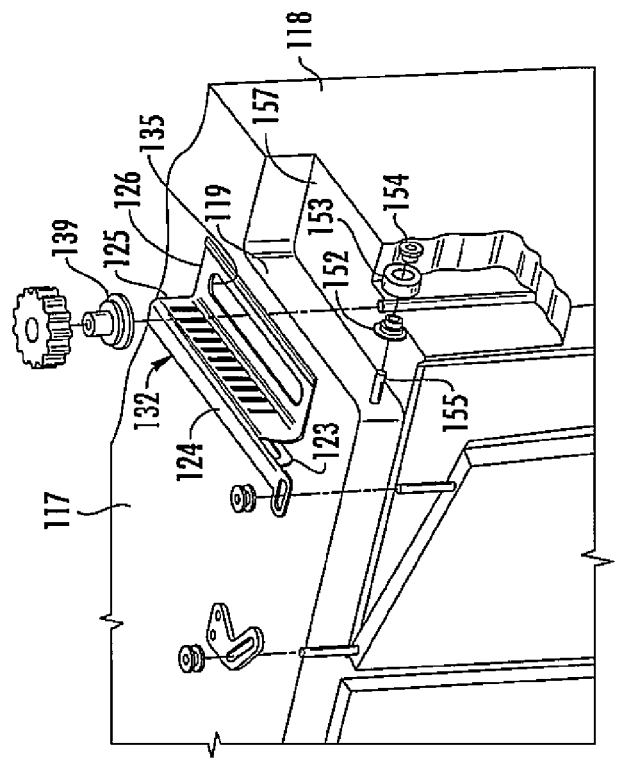
Figure 24:
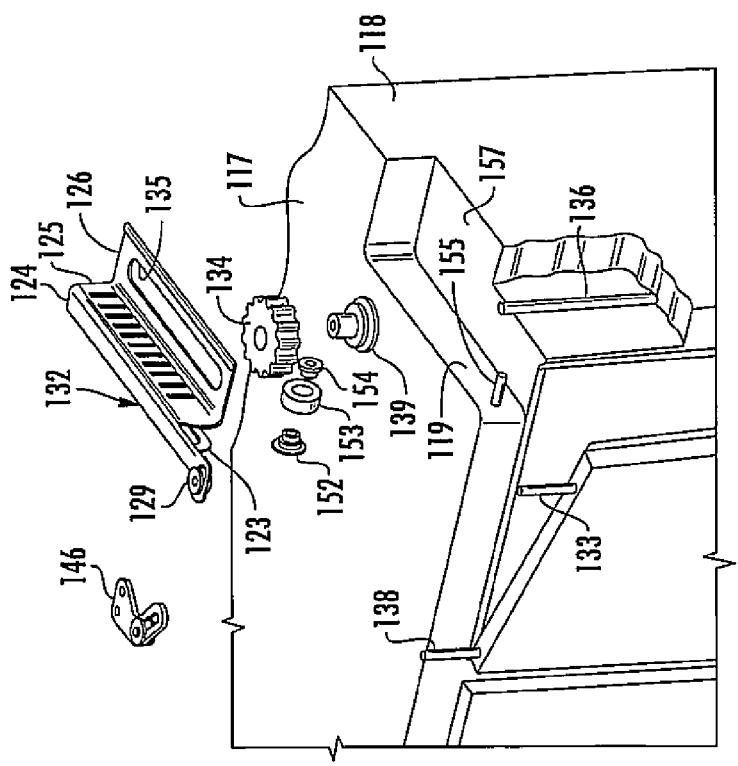

The rack 132 has a generally U-shaped configuration, as best seen in FIG. 23, including an inside vertically extending leg 123, a center horizontal section 124, an outer vertical leg 125, and the horizontally extending leg 126, which includes the slot 135. The gear teeth 137 are formed in the outer leg 125. In addition to being supported by bushing 139, rack 132 is also supported on the side wall 119 of a notch formed in the corner of top 117 of cabinet 110 by a roller bushing assembly including inner and outer bushings 152 and 154, as best seen in FIGS. 24-25, which surround a roller 153. Bushings 152 and 154 extend through slot 127 in leg 123, as best seen in FIGS. 21 and 23, and are rotatably mounted on an axle 155 extending from wall 119. Bushings 152 and 154 captively hold the roller 153 to the leg 123 of rack 132 adjacent side wall 119 while providing guided support with roller 153 engaging a surface 157 (FIGS. 21, 22, 24, and 25) of the cabinet 110. Thus, the rack 132 is supported in both vertical and horizontal planes by the axle 155 and drive shaft 136 for sliding movement when drive shaft 136 is rotated to which pinion gear 134 is attached by means of a suitable set screw or the like. This provides a smooth controlled movement of the rack 132 for opening and closing the filters 120 between positions shown in FIGS. 15-18, 26, and 27, as shaft 136 is rotated.

Figure 26:
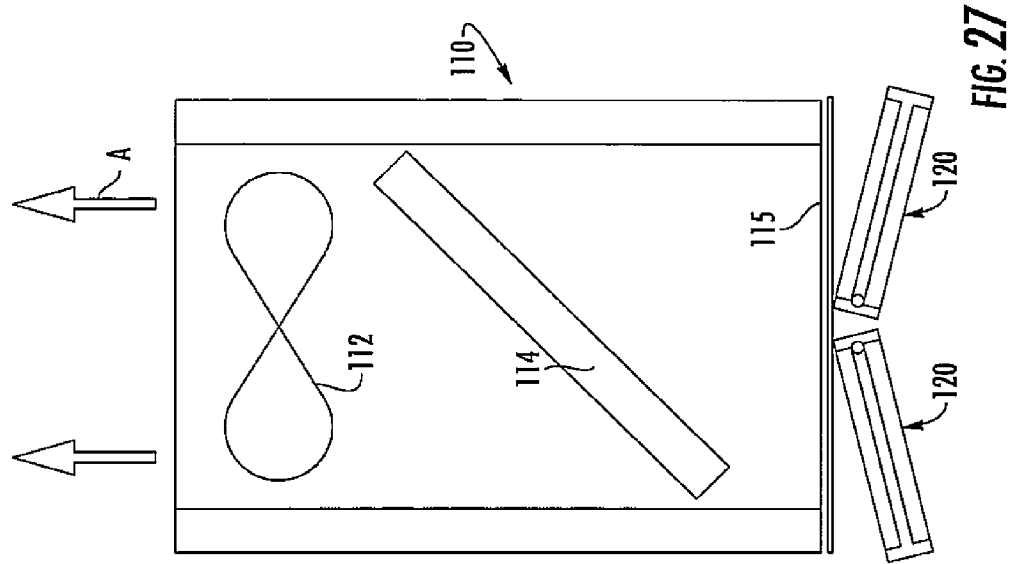
FIGS. 26-27 are top schematic views illustrating the movement of the filters also seen in FIGS. 15-25.
Figure 27:
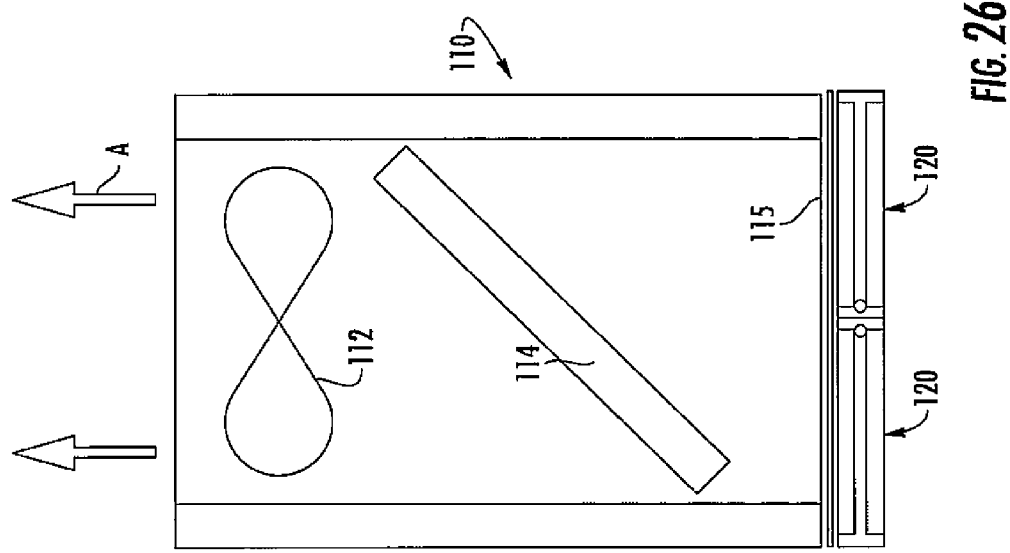

FIGS. 26 and 27 are schematic views of the filters 120 using the actuating structure shown in FIGS. 15-25. FIG. 26 shows the relative position of both of the filters 120 when fully engaged with the cabinet enclosure for the evaporator for maximum air filtration. FIG. 27 shows the filters 120 moved to a partially opened position for increasing the airflow through the evaporator to increase the cooling by the air conditioner and decreasing the filtration of air.

FIGS. 28 and 29 illustrate an alternative mounting of the filter moving mechanism shown in detail in FIGS. 15-25 to a pair of door-like filters 150 that pivot from the corners of the cabinet enclosure 110 instead of the center of the cabinet enclosure 110. In this embodiment, the rack and pinion mechanisms 130 of the prior embodiment are mounted in the center at area 158, as shown schematically at 130 in FIG. 29. In this embodiment, the pivot brackets 146 and associated structure of the prior embodiment are located in the corners as represented by 146 in phantom lines in FIGS. 28 and 29.

FIGS. 30 and 31 illustrate an alternative embodiment in which a single filter panel 160 is slideably mounted to move away from the inlet 116 of cabinet enclosure 110 between the position shown in FIG. 30, in which the filter is fully engaged to provide maximum air filtration for the system, to a position spaced from the outlet of the cabinet enclosure, allowing the air to bypass the filter in a direction indicated by arrows A in FIG. 31, with some airflow still being allowed through the filter 160. The sliding motion of filter 160 away from the cabinet can be accomplished with drawer-type slides driven by a rack and pinion mechanism similar to that of elements 130 in the prior embodiments or other conventional slide mechanism which extends between the filter 160 and the cabinet enclosure 110.

FIGS. 32 and 33 illustrate an alternative embodiment in which a pair of filters 170 and 172 are movable both away from the cabinet enclosure 110 and away from each other, as illustrated in FIG. 33, to provide an airflow path indicated by arrow A in FIG. 33, which extend between the filters as well as around the edges of the filter. Slide mechanisms, such as drawer slides, can be used for both directions of motion, and a rack and pinion drive mechanism similar to that of elements 130 in the prior embodiments can be used to control the movement.

Figure 34:
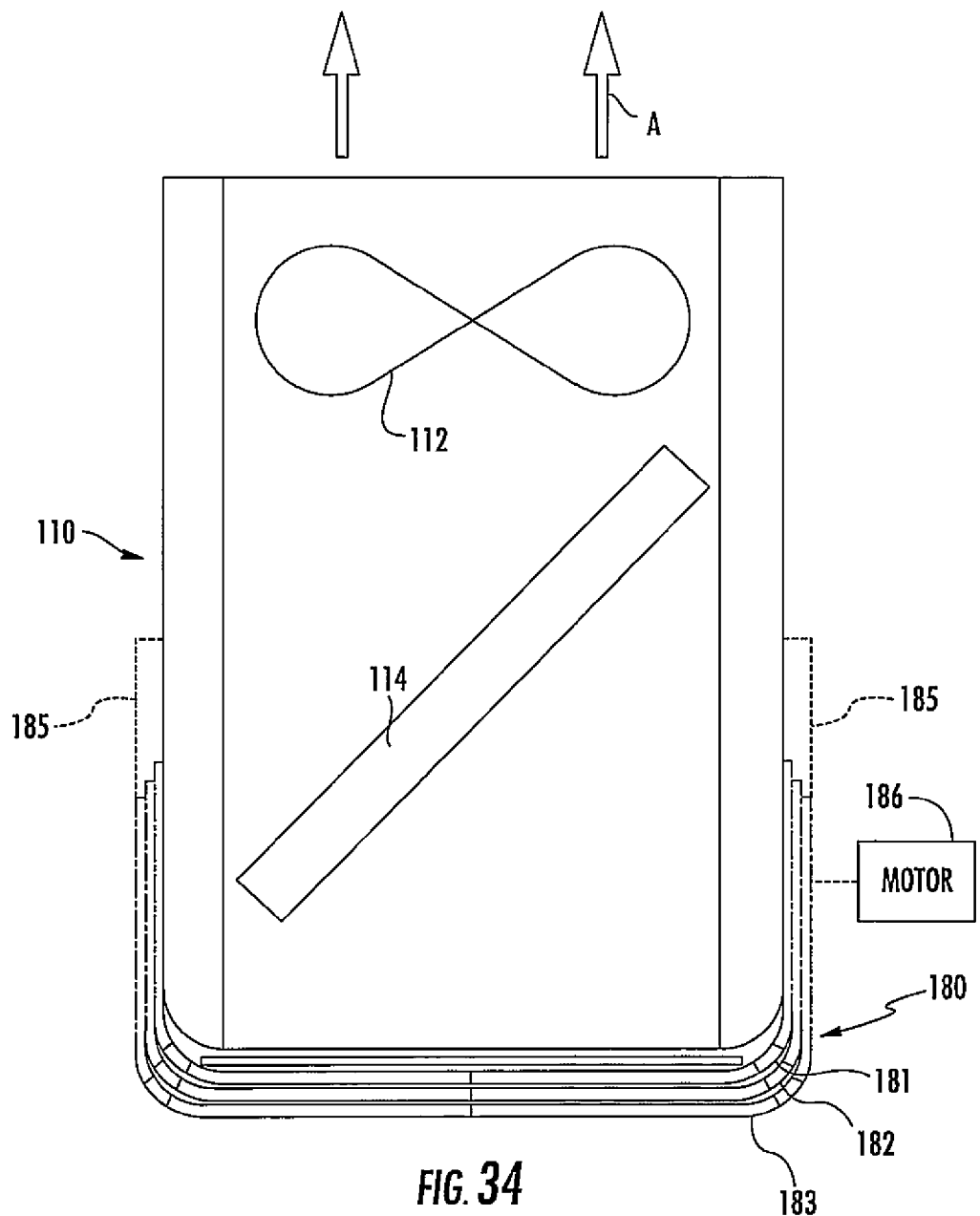
FIG. 34 illustrates in a top plan schematic view a filter construction which can be raised or rolled away, like a garage door, to vary the amount of filtration provided by the system.

Finally, in FIG. 34, there is shown a stacked filter 180 assembly which can be formed in segments structurally similar to that of a garage door or roller top desk. Filter 180 may include multiple segmented filters 181, 182, and 183. Filters 181-183 can be selectively moved to place any combination of one or more of the filters in a series flow path at the inlet of enclosure 110. Filters 181-183 can be made of the same filter media as in prior embodiments to provide the desired and selected amount of filtering of dust, pollen, volatile organic compounds, or other particulate or microbial material. The control circuit for moving the filters and controlling the unit can be the same microprocessor-based system as described below in other embodiments. For such purpose, the panels of the segmented filters 181-183 would be coupled to axles with rollers fitted within curved tracks 185 (shown schematically in FIG. 34) on either side of the cabinet enclosure 110 and extending down the front. The filters 181-183 are each coupled to a motor 186 (one shown schematically in FIG. 34) to position the filter a desired amount for selectively changing the airflow through the filter and cabinet enclosure 110. For all the embodiments describe herein that provide for deployment of the filter into or out of the airflow stream or partially into the airflow stream, it is possible to run the indoor air conditioning unit optimally either in air conditioning mode for cooling and dehumidification or without cooling and use as an air purification system or combined operation where cooling load might be low and the volume of airflow with the filter in full participation is the optimal user sought condition. Thus, the system can operate with 100% cooling and no filtration, 100% air filtration with no cooling, or any desired combined range of 0%-100% of either mode. Typically, when maximum cooling is desired, filtration will be disabled (i.e., not engaged) when cooling is not being called for, the filters can be fully engaged as the system fan draws air through the filter(s) for maximum filtration.

Selective positioning of the dampers (FIGS. 1-14) or filters (FIGS. 15-34) can be done manually or with the control of electromechanical motor control systems. These systems can be controlled by the user of the system by manually moving the filters, with a wireless remote control and receiver coupled to a control circuit for adjusting a motor connected to the filters, or by a remote sensor and control circuit. The remote sensor/control can evaluate the 'cleanliness' and desired air temperature and send the settings to the filter motor for adjustments as desired.

Figure 35:
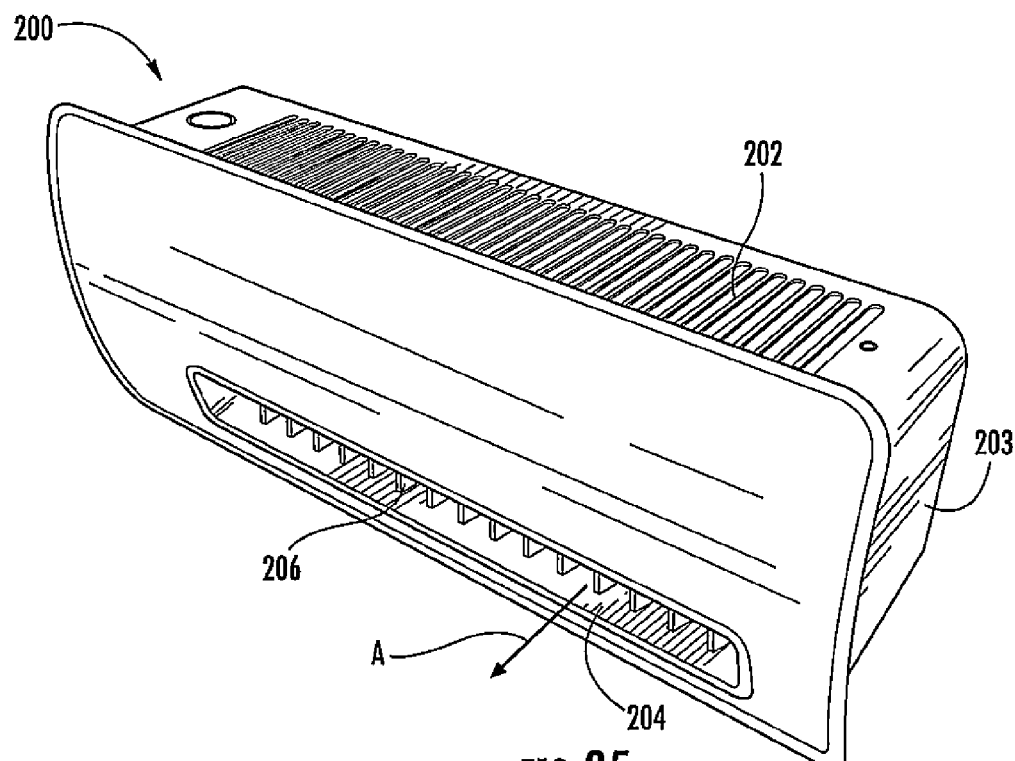
FIG. 35 is a perspective view of a wall mounted air conditioner evaporator unit of one embodiment of the present invention.

FIG. 35 discloses an air conditioning unit 200 with a cabinet 203 which is specifically adapted to be mounted to a wall of a room, such as a bedroom. The cabinet includes a fan and an evaporator coupled to an outdoor compressor unit by suitable inlet and return refrigerant lines. The unit 200 will typically be mounted relatively high in the room and includes an air inlet grill 202 near the top to draw warm air from the ceiling area of the room, cool it, and exhaust it through the outlet 204. Outlet 204 includes adjustable vanes 206 for directing the flow of air (arrow A) from the unit. The air conditioner unit 200 will typically include a conventional control panel and/or remote control (not shown) for use by the operator in setting the desired room temperature.

Figure 36:
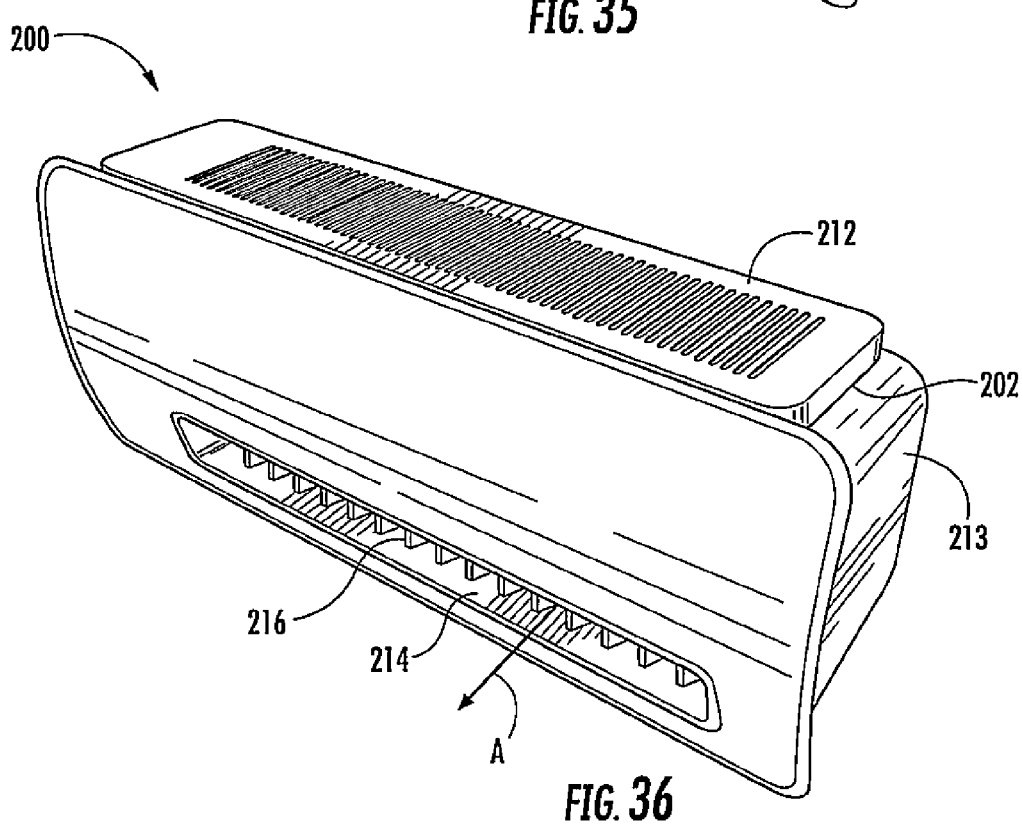
FIG. 36 is a perspective view of the air conditioner shown in FIG. 35, with the addition of a filter unit.

The same type of unit 210 is shown in FIG. 36 and has the same construction except that it further includes a filter 212 covering the air inlet 202 of the cabinet 213. Unit 210 also has a discharge air outlet 214 with adjustable vanes 216 for directing the flow of air as desired by the operator. The filter 212 can be any type of filter as previously described, including stacked filter elements, although since it is a stationary filter 212, it should not interfere with the flow of air indicated by arrow A in FIG. 36. Filter 212 will be effective in filtering the air from unit 210 whether the compressor and evaporator are in an operational mode to provide cooling air or whether the fan in unit 210 is in operation only. Thus, unit 210 can provide both filtered and cooled air or filtered air only for the user.

Figure 37:
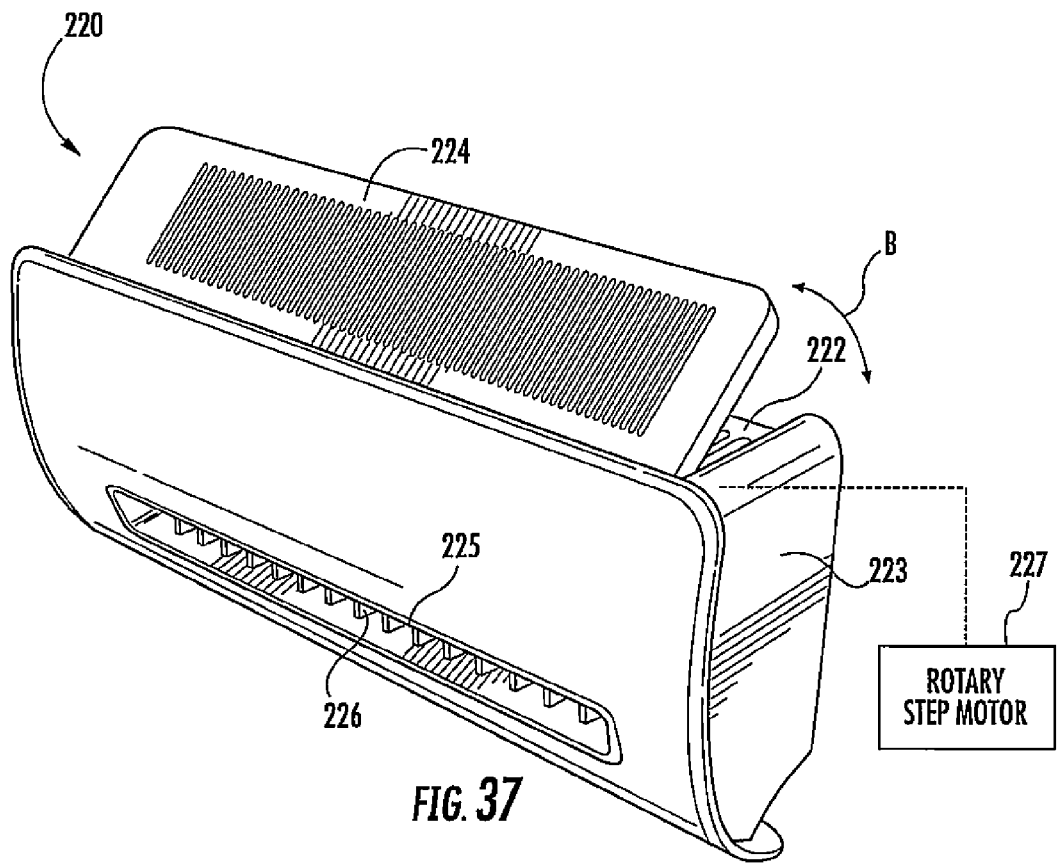
FIG. 37 is a perspective view of an air conditioning unit showing a filter which can be selectively pivoted between fully engaged, fully bypassed, and intermediate positions.

FIG. 37 discloses yet another air conditioning unit 220 with an air inlet 222 at the top of the unit and a pivoted planer filter 224 to selectively cover the air inlet 222. The air conditioner unit 220 includes an outlet 225 with vanes 226 for directing the flow of air into a select area of the room as desired. The filter 224 is controlled by a rotary step motor 227 coupled to a pivot axle extending between the cabinet 223 and the filter 224, as shown schematically in FIG. 37. Actuation of motor 227 can pivot the filter 224 in a direction indicated by arrow B in FIG. 37 between a fully engaged position, such as the filter in FIG. 36, a substantially open position, as illustrated in FIG. 37, and intermediate positions. Filter 224 can be made of the same filter media as in prior embodiments to provide the desired and selected amount of filtering of dust, pollen, or other particulate or microbial material.

The step motor is controlled by a control circuit which is operator actuated to select a desired amount of filtering (such as 50%) or by a sensor to activate full filtering with the fan running and the compressor in the off condition. The circuit, as with other control circuits used with the air conditioner units of these inventions, will typically include a microprocessor programmed to respond to operator inputs and/or sensor inputs and/or time. The microprocessor provides output control signals to drive circuits to actuate the step or other filter moving motors or actuators and to the compressor in a conventional manner.

Figure 38:
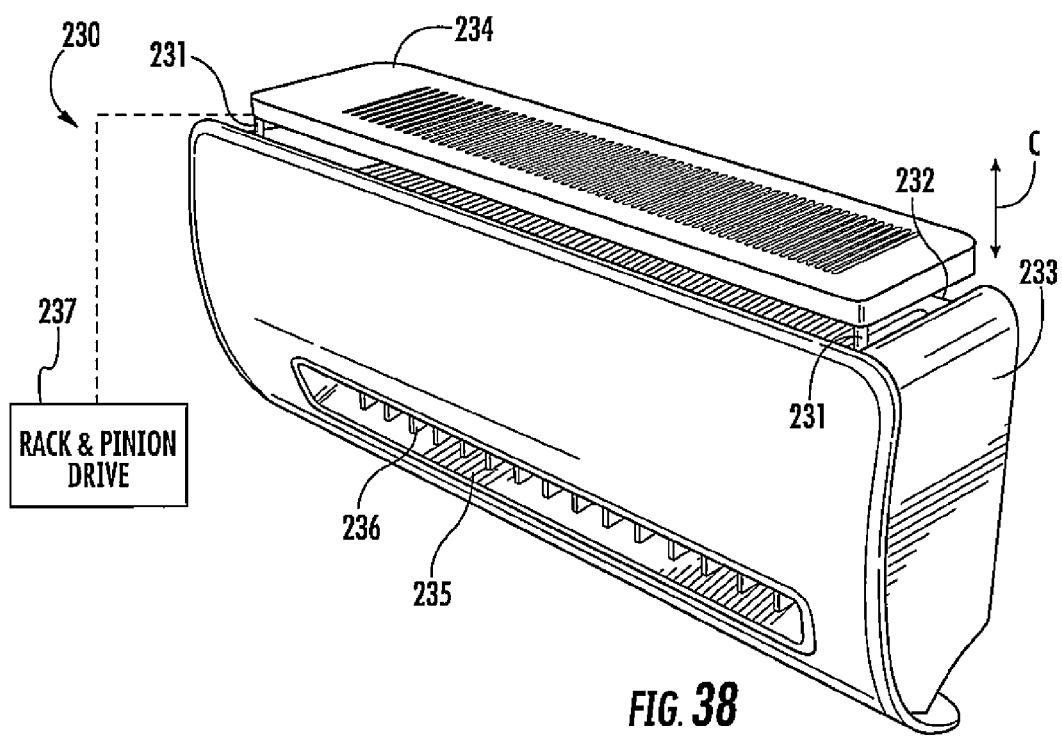
FIG. 38 is an air conditioning unit showing a filter which can be vertically moved between a fully engaged, substantially bypassed, and intermediate positions.

FIG. 38 is yet another embodiment of an air conditioning unit 230, which includes an air inlet 232 and a movable filter 234, which is vertically movable, as indicated by arrow C, toward and away from the air inlet 232 to selectively allow air to bypass the filter 234 and enter the unit for cooling and a selective amount of filtering. The air exits the unit through discharge opening 235, the flow direction of which is controlled by adjustable vanes 236. The filter 234 is coupled to the cabinet 233 of the air conditioner unit 230 by suitable guide tracks 231 (represented schematically in FIG. 38). The filter can be moved by a rack and pinion drive mechanism 237, as shown schematically in FIG. 38, such that the filter 234 can be selectively opened and closed as desired to either provide maximum cooling with no filtration, maximum filtration when cooling is not desired, and intermediate operation. If maximum filtration is desired, the filter is fully engaged when the compressor is on or when the compressor is turned off and the fan is still in operation. Filter 234 can be made of the same filter media as in prior embodiments to provide the desired and selected amount of filtering of dust, pollen, or other particulate or microbial material.

In either of the movable systems shown in FIGS. 37 and 38, a conventional temperature control system is employed for operating the air conditioner itself and an electronic filter control is provided for actuating the rotary step motor 227 and/or the pivoted filter 224 or the rack and pinion drive 237 in the vertically movable filter 234. The control system will include typical angle sensors for determining position of filter 224 or linear sensors for determining the position of filter 234 with respect to the cabinets. Filter 224 can be made of the same filter media as in prior embodiments to provide the desired and selected amount of filtering of dust, pollen, volatile organic compounds, or other particulate or microbial material.

Figure 39:
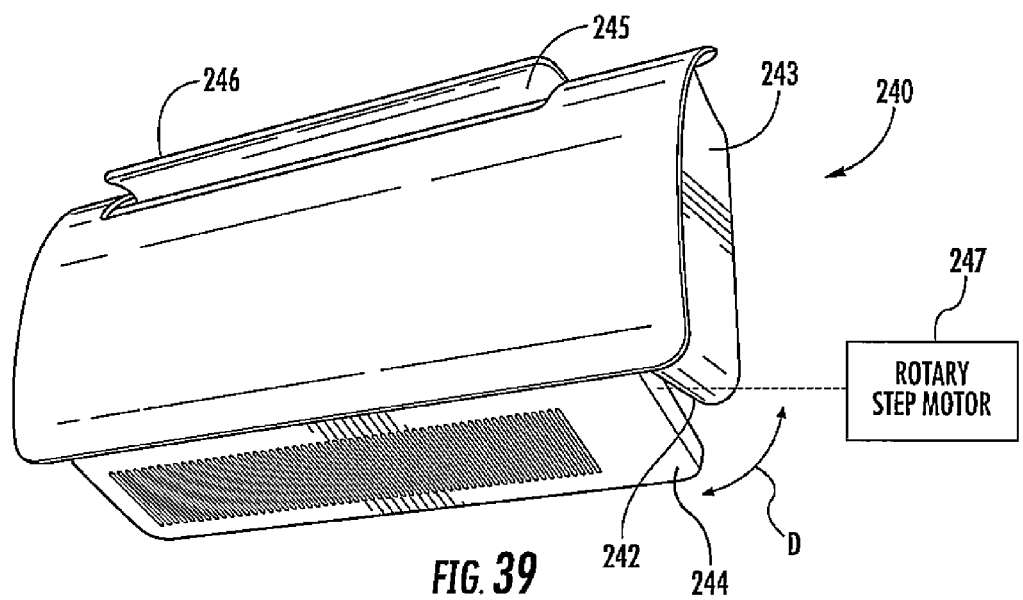
FIG. 39 is a perspective view of an air conditioner unit with a conditioned air outlet at the top and a pivoted adjustable air inlet filter at the bottom.

FIG. 39 is an alternative embodiment of the invention with an air conditioner unit 240 having a cabinet 243 with a pivoted filter 244 covering an air inlet 242 at the bottom of the unit. A conditioned air outlet 245 is located at the top and includes a movable vane 246 for directing the discharge of air. In this unit, the cooler air from below the unit is drawn into the unit and discharged from the top into or underneath the warmer upper temperature zone of the room. The filter 244, which can be of the same type as the remaining filters described in this application, is pivotally mounted to cabinet 243 by an axle which is controlled by a rotary step motor 247, shown schematically in FIG. 39, to pivot filter 244 in the direction indicated by arrow D between fully engaged, fully disengaged, and intermediate positions, as controlled by an electrical control circuit, such as described above. Filter 244 can be made of the same filter media as in prior embodiments to provide the desired and selected amount of filtering of dust, pollen, volatile organic compounds, or other particulate or microbial material.

Figure 40:
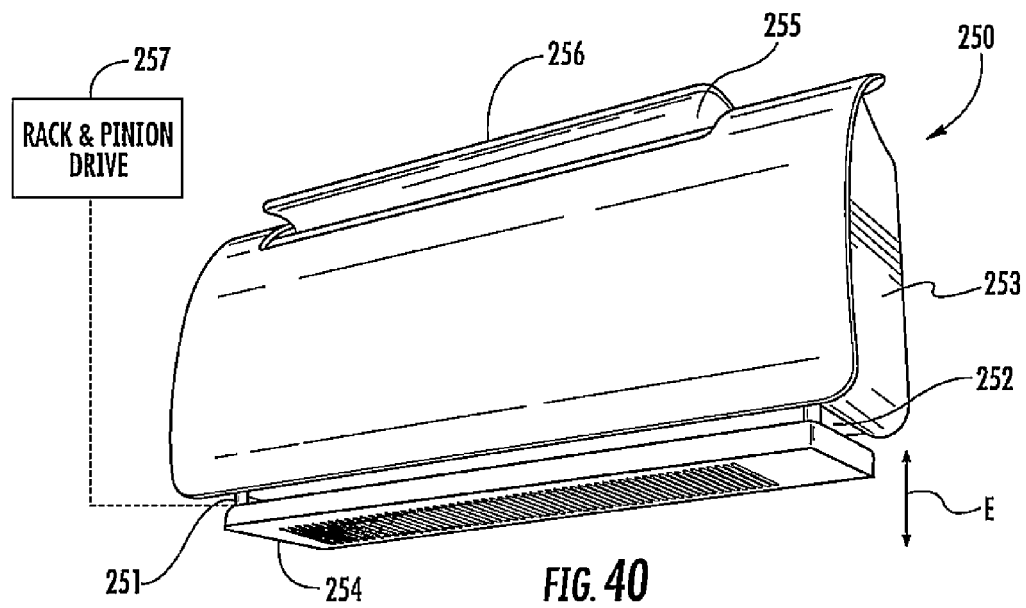
FIG. 40 is a perspective view of an air conditioning unit with a conditioned air outlet at the top and a displaceable filter unit at the bottom which can be moved between engaged, bypassed, and intermediate positions.

FIG. 40 shows yet another embodiment of an air conditioner unit 250 having air inlet 252 at the bottom and a conditioned air outlet 255 at the top with an adjustable vane 256 for directing the airflow from the top of the unit 250. An adjustable filter 254 is mounted over the air inlet 252. The air filter 254 is movably attached to the inlet and movable in the direction indicated by arrow E on guide tracks 251, shown schematically in the figure and controlled by a rack and pinion drive 257, also shown schematically in FIG. 40.

This adjustable filter control can be of the same type as used in the FIG. 38 embodiment. Thus, filter 254 can be moved toward and away from the cabinet and inlet 252 as shown by arrow E for selectively providing a greater or lesser degree of filtering for the air entering inlet 252 between a fully filtered condition and a partially filtered condition or positions in between. Filter 254 can be made of the same filter media as in prior embodiments to provide the desired and selected amount of filtering of dust, pollen, volatile organic compounds, or other particulate or microbial material.

Figure 41:
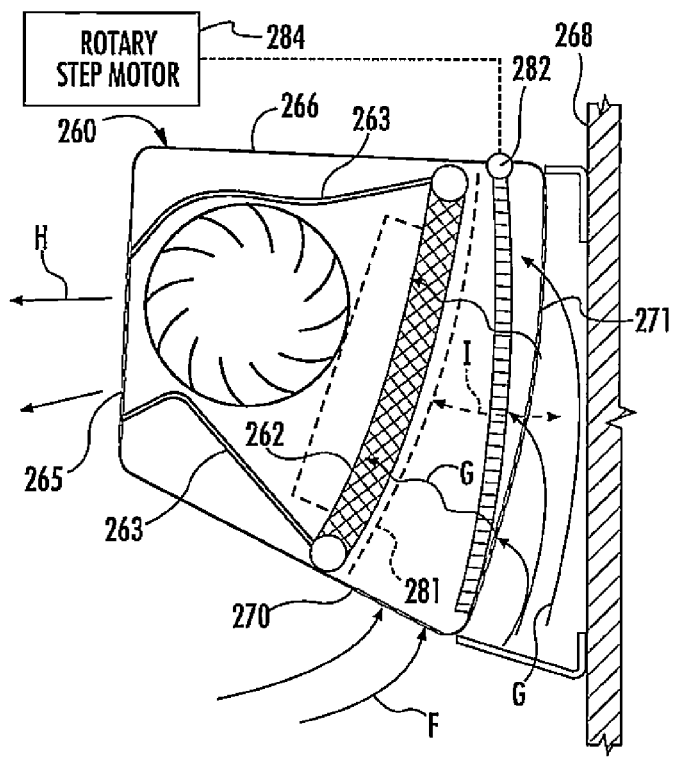
FIG. 41 is a schematic vertical cross-sectional view of an air conditioning unit which has a lower air inlet and a pivoted filter allowing selective filtration and cooling of air passing through the air conditioning unit.
Figure 42:
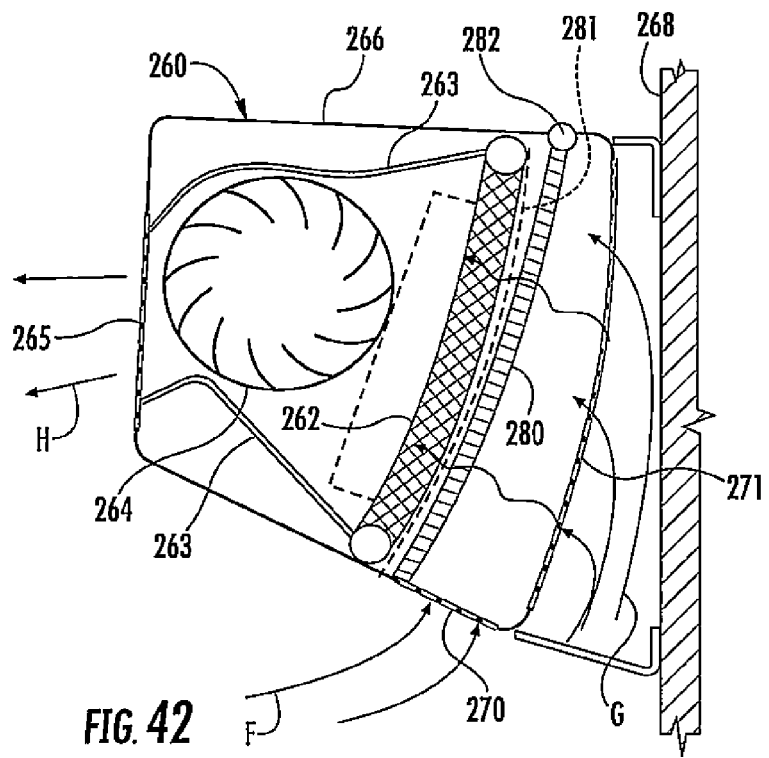
FIG. 42 is a vertical cross-sectional view of the air conditioner of FIG. 41, shown with the filter in a fully engaged position.

FIGS. 41 and 42 illustrate another embodiment of the invention in which an indoor portion of a split air conditioner unit 260, including an evaporator 262 and fan 264 are enclosed in a cabinet 266 mounted on a wall 268 of a structure for cooling a room. Baffles 263 direct the airflow around fan 264. Typically, the unit 260 will be mounted near the ceiling of the structure. The cabinet includes an air inlet 270 near the bottom of the cabinet in the form of an air inlet grill which also extends vertically in the area 272 of the cabinet behind a pivoted filter 280, which is pivotally mounted to cabinet 266 by a pivot axle 282. A gross particulate screen filter 281 is positioned in the airflow path at the input of evaporator 262 and between the evaporator and filter 280. Filter 280 can be made of the same filter media as in prior embodiments to provide the desired and selected amount of filtering of dust, pollen, volatile organic compounds, or other particulate or microbial material. As seen in FIG. 41, some air from side air inlets can also enter the unit through the extended rear grill 271 and pass through filter 280, although the substantial majority of the air indicated by arrow F entering grill section 270 bypasses filter 280. The supplemental air, shown by arrow G, is filtered to some extent, although a majority of the air bypasses the filter. Filter 280 is controlled by a rotary step motor 284, shown schematically in FIG. 41, coupled to axle 282 to move between the substantially open position of FIG. 41, allowing the majority of air to flow through evaporator 262 in an unfiltered condition to the maximum filtering position shown in FIG. 42.

FIG. 41 represents a highly efficient maximum cooling mode in which cooler air near the lower side of the cabinet 260 is drawn into the cabinet. By providing for the return airflow to be induced into the evaporation unit from the bottom side of the cabinet as shown in FIG. 41, a stratification of air temperature in a given volume of cooled space can be realized. This stratification provides for real use energy savings for the user as the upper portion of the living space does not need to be cooled. By not cooling this area as do typical wall-mounted air conditioners that draw and discharge air at this higher level, less energy is expended. Additionally, since the unit 260 tends to draw in cooler/dryer air from the lower stratified level, less energy is expended, since the unit need not work as hard under the lower load condition.

In FIG. 42, the filter 280 is rotated to be immediately adjacent the screen filter 281 and evaporator 262 so that all air, indicated by arrows F and G, is filtered before being discharged through air outlet 265 at the front of the unit and facing the interior of the room. The air filter, in essence, serves as a damper for directing all of the incoming air through the filter 280. This maximum filtration mode of operation is usually run with the fan 264 on only and without compressor operation. The filtered air, indicated by arrow H, can thus be either filtered or substantially cooled only. The filter 280 is movable, as shown by arrow I in FIG. 41, to any position between the extreme positions of FIGS. 41 and 42 to provide an intermediate amount of filtration and cooling.

Filter 280 can be made of the same filter media as in prior embodiments to provide the desired and selected amount of filtering of dust, pollen, volatile organic compounds, or other particulate or microbial material. The control circuit for moving the filters and controlling the unit can be the same microprocessor-based system as described above in earlier embodiments.

Figure 43:
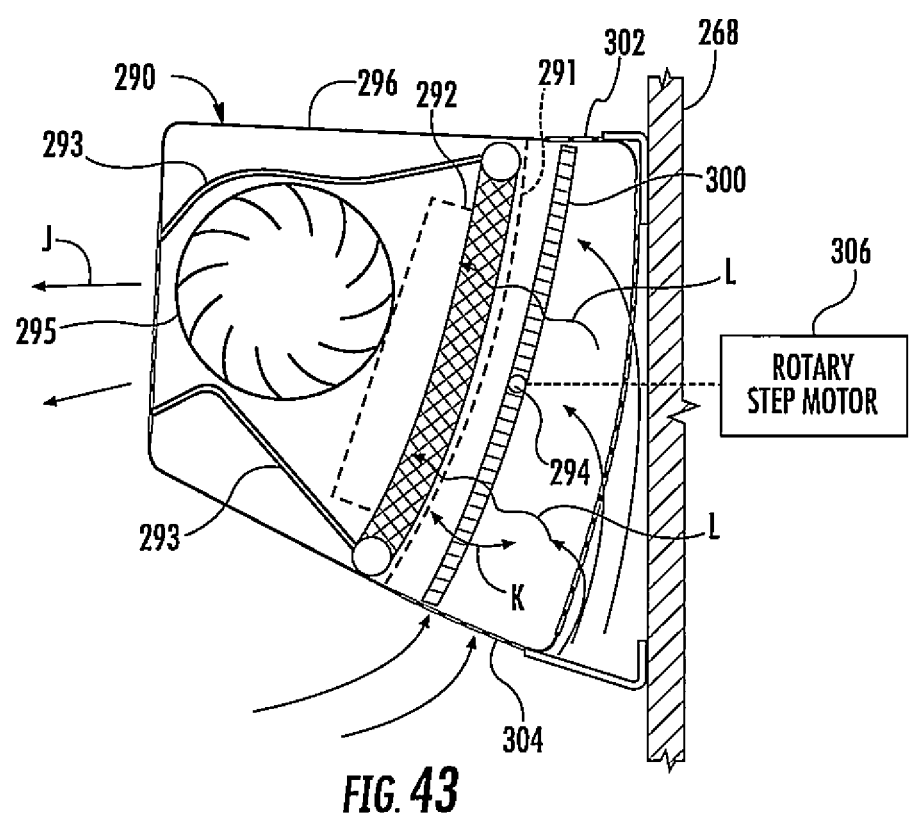
FIG. 43 is a schematic vertical cross-sectional view of an air conditioning unit with a pivoted filter which allows the selective entry of air from the top and/or bottom of the unit for selective filtration and cooling.

FIG. 43 shows an alternative embodiment of a wall-mounted air conditioning/filtering unit 290 which, like the earlier described units, is mounted to a wall 268 of a structure somewhat near the ceiling area. The unit 290 includes a cabinet 296 housing an evaporator 292. Connected on the incoming side of the evaporator is a gross particulate filter screen 291 behind which there is pivotally mounted a filter 300. Filter 300 is pivotally mounted to cabinet 296 by a centrally located pivot axle 294 coupled to a rotary step motor 306 to rotate the filter 300 in either a clockwise or counterclockwise direction. The cabinet includes an upper air inlet 302 and a lower air inlet 304 which, depending upon the position of filter 300, allows either warmer air from the ceiling area to enter inlet grill 302 or, if the filter 300 is rotated counterclockwise, inlet 304 is effectively opened, allowing cooler air to enter on the screen side 291 of filter 300, thereby bypassing, in large part, the filter 300. This provides maximum cooling with blower 295 drawing air through the evaporator 292 which is guided by upper and lower baffles 293 with cool air exiting in the direction indicated by arrow J in FIG. 43.

Thus, filter 300, which can be rotated on axle 294 by a rotary step motor 306 coupled to the axle can provide different modes of operation, when rotated as indicated by arrow K in FIG. 43. The airflow ratio from the upper inlet 302 and lower inlet 304 can be varied approximately 30% to 70%. In the intermediate position shown, significant filtration is taking place as most of the air enters filter 300 as indicated by arrows L. If the filter is rotated in a clockwise direction, most of the inlet air from lower inlet 304 passes through to the filter to provide maximum filtering. As in prior embodiments where maximum filtration is desired, typically, it will be in a mode where the fan only is in operation and the compressor is turned off. For maximum cooling, the filter is rotated counterclockwise for maximum airflow through the evaporator 292, bypassing filter 300. The filter 300 can be made of the same filter media as in prior embodiments to provide the desired and selected amount of filtering of dust, pollen, volatile organic compounds, or other particulate or microbial material.

Figure 44:
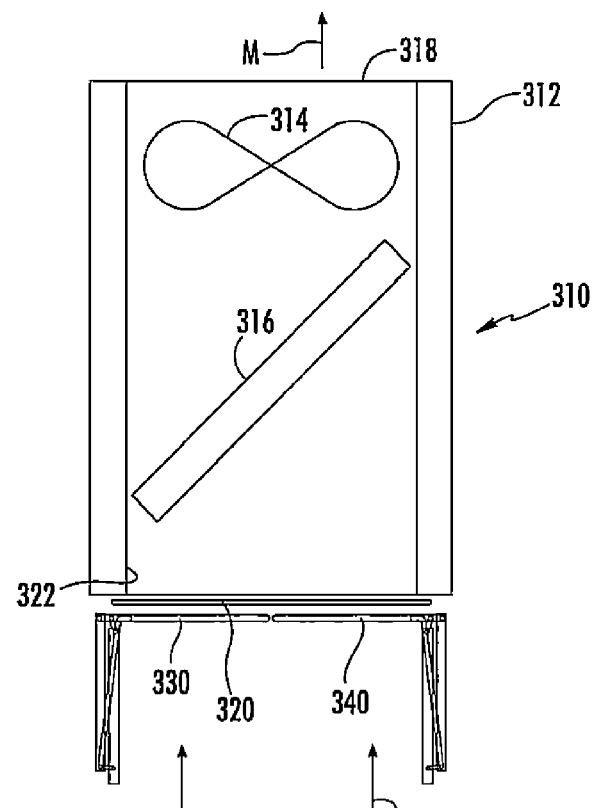
FIG. 44 is a top schematic view of an air conditioning unit with two pairs of filters and guide tracks, shown with the filters in an open position to allow unfiltered air to flow through the air conditioner unit for maximum cooling.
Figure 45:
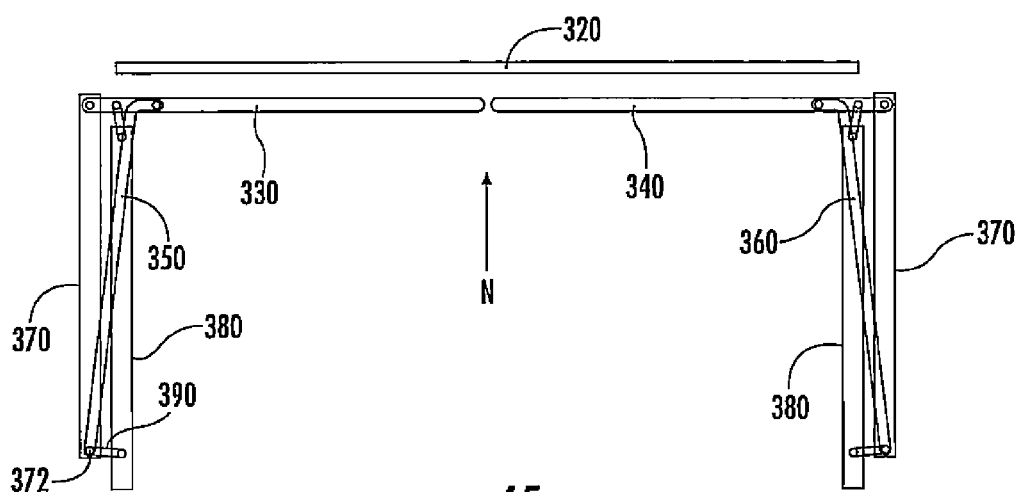
FIG. 45 is an enlarged schematic view of the left and right filter mounting structures for the unit shown in FIG. 44.

FIGS. 44-54 illustrate a split air conditioning system with movable stacked filters 370, 380 in a floor-mounted, free-standing evaporator/fan indoor unit which couples to an outdoor-mounted compressor through input and return refrigerant lines in a conventional manner. The freestanding air conditioner 310, as shown in these figures, includes a cabinet 312 housing a fan 314 for drawing air through an evaporator 316, which is coupled to the outdoor compressor. The cabinet 312 has an air outlet at end 318 for discharging filtered and/or cooled or cooled and filtered air in a direction indicated by arrow M. Air entering the cabinet 312 in a direction indicated by arrows N passes through a gross particulate screen-type filter 320 before entering the inlet 322 of the unit 310. In front of the screen gross particulate filter 320, there are a pair of fixed laterally extending filter tracks 330 and 340 which, as described below, will allow the aligned movement of stacked filters across the inlet end 322 of the air conditioner unit 310. Additional tracks 350 and 360 extend generally orthogonally outwardly from the cabinet 312 to allow filters to be selectively moved from a stored position (as shown in FIGS. 44 and 45) to selectively stacked use positions (as shown in the remaining figures).

Figure 46:
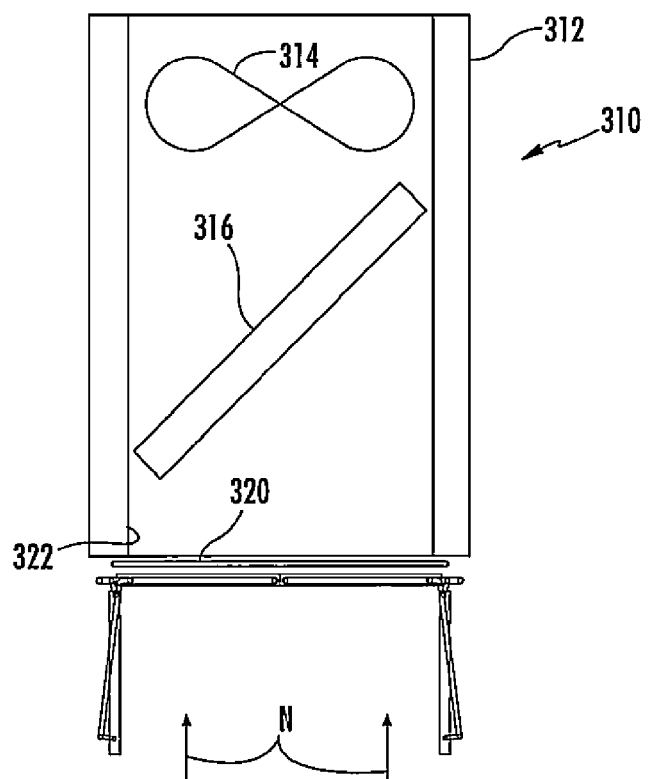
FIG. 46 is a schematic view of the system shown in FIGS. 44 and 45, shown with one of the pairs of filters moved to a filtering position.
Figure 47:
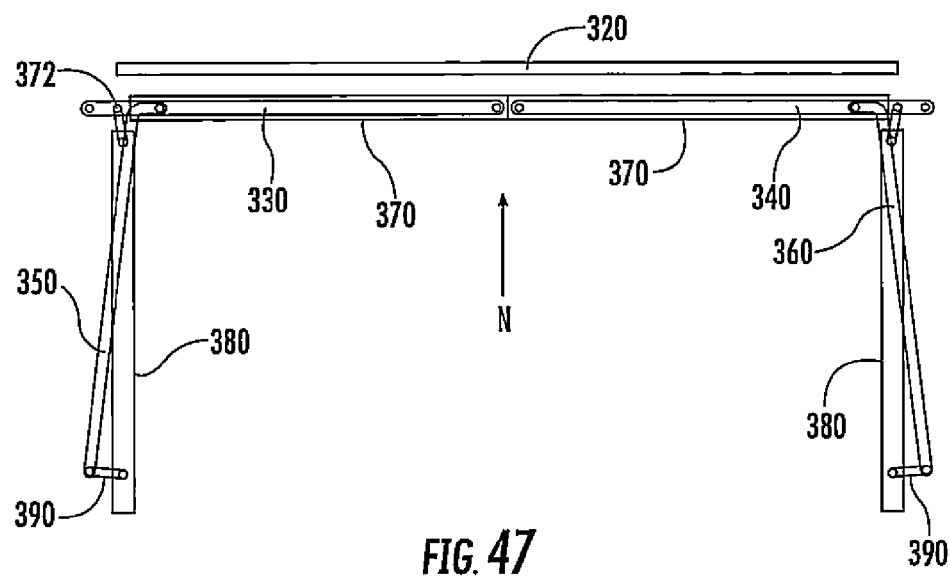
FIG. 47 is an enlarged schematic view of the filter mounting structure shown in FIG. 46.
Figure 48:
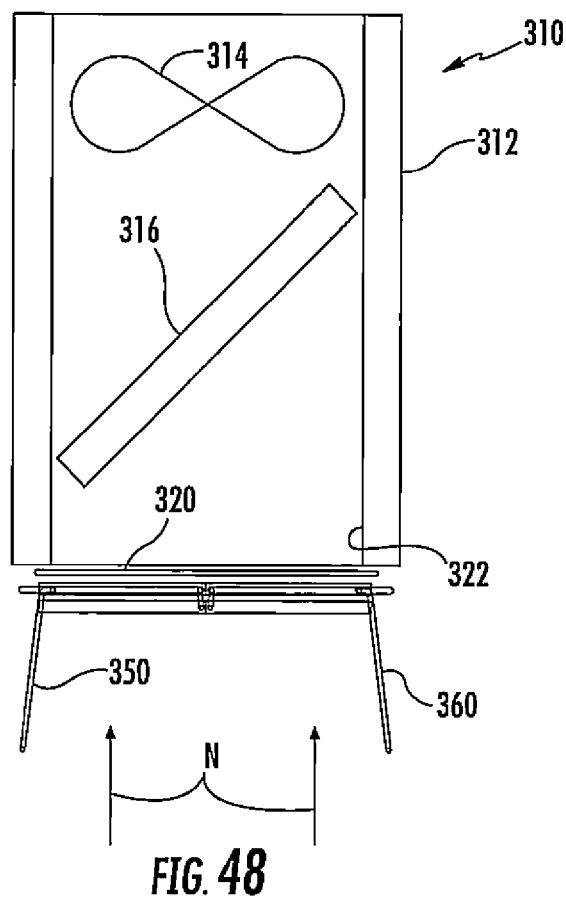
FIG. 48 is a top schematic view of the air conditioning unit, shown with both pairs of filters stacked in a use position so that air flows through both filters prior to entering the evaporator unit.
Figure 49:
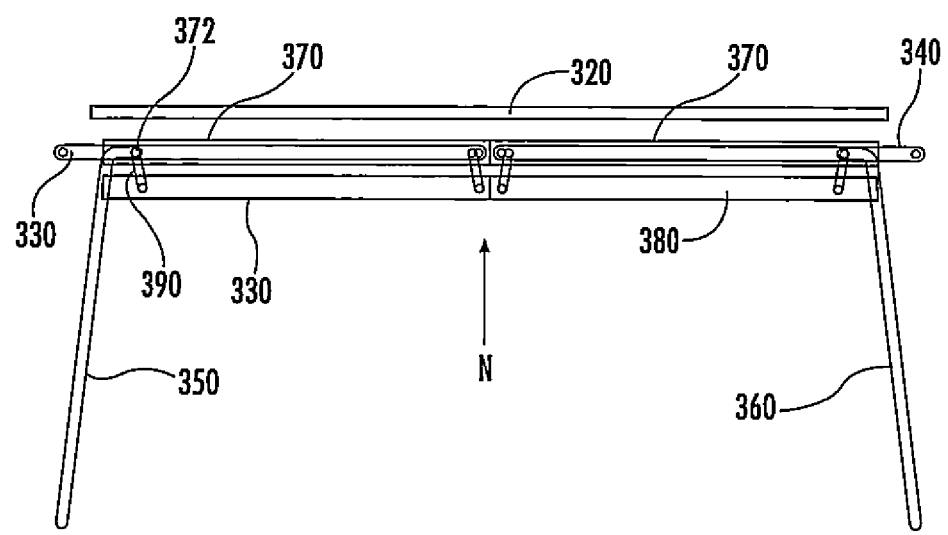
FIG. 49 is an enlarged schematic view of the filter mounting structure shown in FIG. 48.
Figure 52:
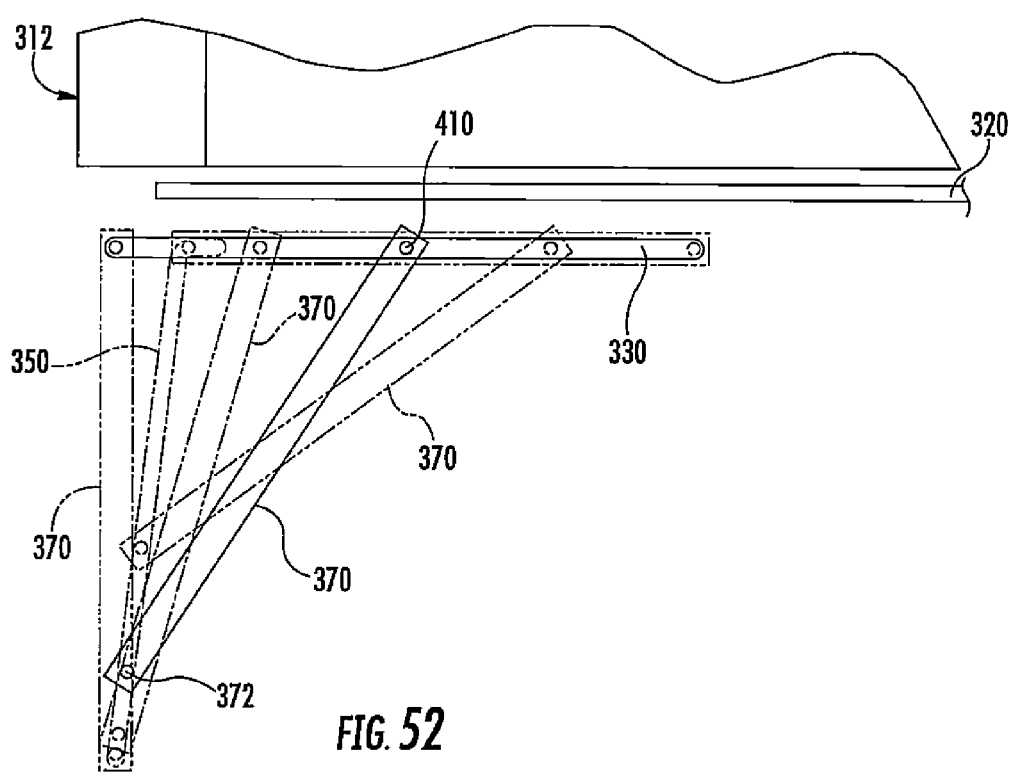
FIG. 52 is an enlarged schematic view, shown partly in phantom form, showing the movement of one of the filter from an in-use position to an open position.
Figure 53:
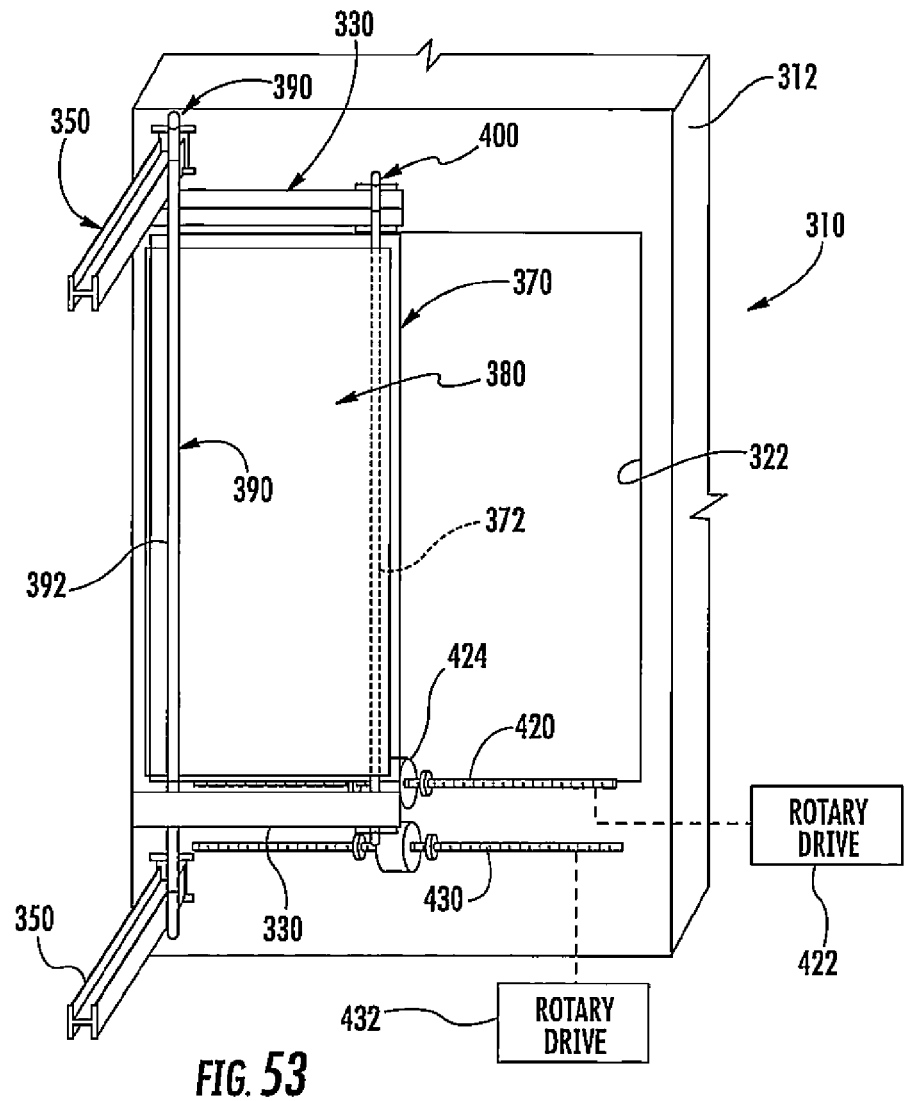
FIG. 53 is a schematic view of the air conditioner system shown in FIGS. 44-52 showing the left side filter and twin drive screw mechanism for selectively moving each of the filter pairs between open, closed, and intermediate positions.

The filters include an inner filter 370 movably mounted to upper and lower dual channel tracks 330, 340, 350, and 360 on each side and outer filters 380 also movably mounted to the upper and lower tracks 330 and 340, 350 and 360 on each side. The tracks guide and control the filter movement and include upper and lower pairs of dual channel tracks as shown in FIG. 53 for guidably supporting the generally rectangular inner (370) and outer (380) filters. The filters ride in tracks 330, 340, 350, and 360 to positions shown in FIGS. 44 and 45, where they are stored away from the unit and no filtering takes place. In FIGS. 46 and 47, the inner filter 370 on each side has been moved to a position for providing filtering prior to the gross filter 320 at the inlet end 322 of the cabinet. In FIGS. 48 and 49, both the inner filter 370 and outer filter 380 have been moved into a stacked (i.e., series flow) relationship to each other in the tracks to provide maximum filtration for the incoming air as indicated by arrow N. The inner filters 370 typically will have different filtering characteristics than the outer filters 380. Thus, filters 370 may be a fine particulate filter while filters 380 may be made of a pollen or microbial filtering material. The inner and outer filters can be selected to provide filtering for particular allergens that may be of concern to the consumer. The filters 370 and 380 can be selectively moved by the control system shown in FIGS. 53 and 54, such that either filters 370 or filters 380 can be positioned in a filtering position across the inlet 322 of the unit 310 or both of the filters placed in a stacked configuration as shown in FIGS. 48 and 49. The movement of the filters in tracks 330 and 340, 350 and 360, is now described, first in conjunction with FIGS. 50-52 and subsequently in connecting with the drive mechanism described with reference to FIGS. 53-54.

Figure 50:
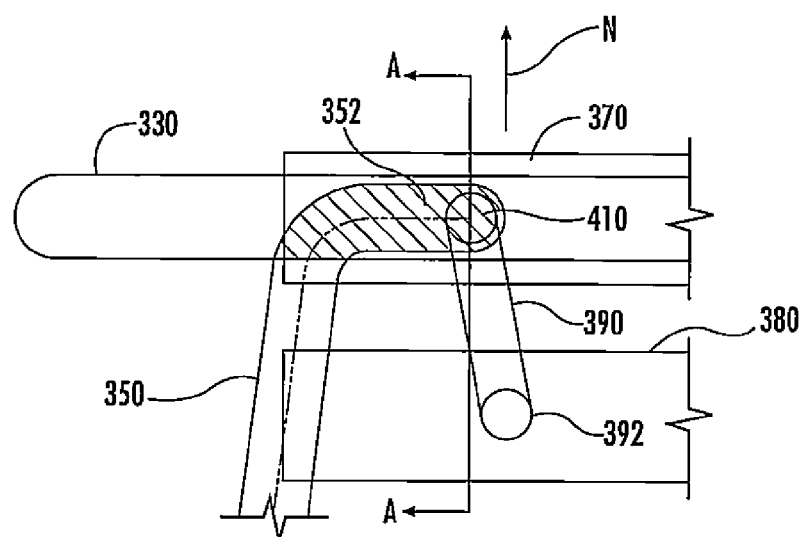
FIG. 50 is a fragmentary top plan view, partly in cross section, of a section of the filters and guide tracks associated therewith.
Figure 51:
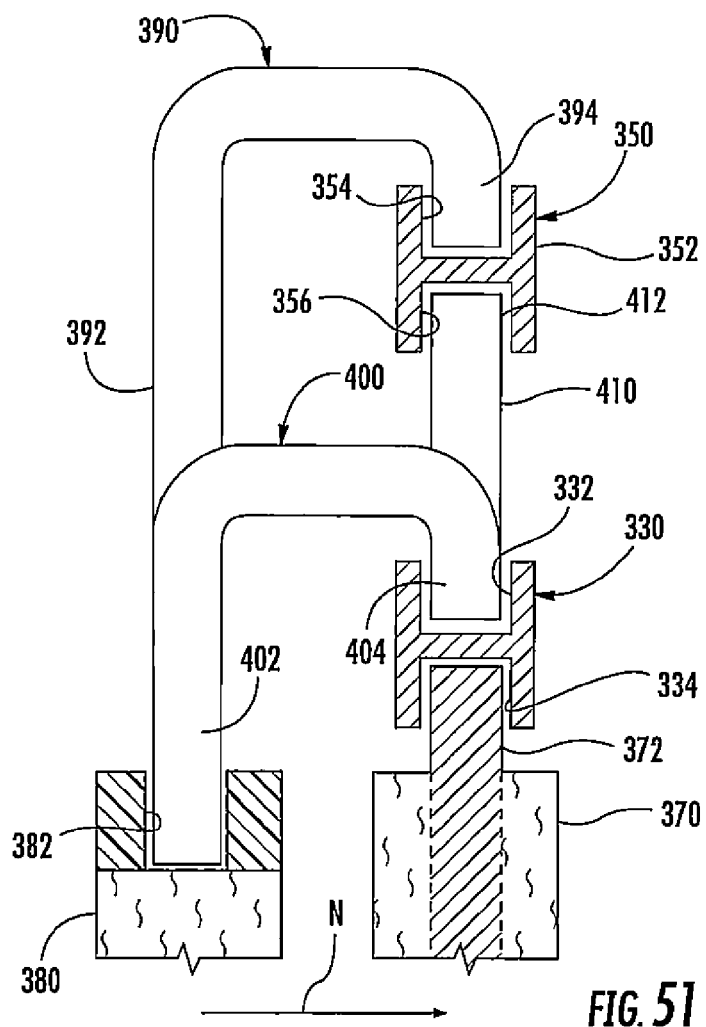
FIG. 51 is an enlarged cross-sectional view, taken along section lines A-A of FIG. 50.

FIGS. 50 and 51 illustrate the relationship between tracks 330 and 350 and filters 370, 380 on the upper left corner of the unit 310 (as seen in FIG. 53). The construction of tracks 340 and 360 and filters 370, 380 on the right corner are mirror images. Also, mirror image lower tracks 330 and 350 (FIG. 53) are provided to movably support filters 370 and 380. Thus, guide tracks 330, 350 have upper and lower components, as do guide tracks 340, 360. Tracks 330, 350 are each generally H-shaped in cross section, as best seen in FIGS. 51 and 53, with track 330 including an upper guide channel 332 and a lower guide channel 334.

Inner filter 370 includes a rod 372 made of a suitable rigid material, such as metal, and which extends through the filter and supports the outer edge (left in FIGS. 46-49) of the filter 370. Rod 372 extends into the lower guide channel 334 of upper track 330 and into the corresponding upper guide channel of lower guide track 330. The inner filter also has a second rod 410 which is fixedly mounted to and extends vertically through filter 370. The upper end 412 of rod 410 is located on the inner side of filter 370, i.e., to the right as viewed in FIG. 47, and rides within guide channel 356 of track 350 as the filer is moved between fully engaged and disengaged positions. The lower end of rod 410 extends into an upper channel (such as channel 332, FIG. 51) of the carriage riding lower guide track 330.

As seen in FIGS. 50 and 51, the inner end of track 350 is curved at approximately 90° to define an end 352 which is spaced above and vertically aligned with track 330. Track 350 is also H-shaped having an upper guide channel 354 and a lower guide channel 356. The outer filter 380 includes a rod 390 at its left edge (as seen in FIG. 48) with a generally U-shaped connecting pin with an end 394 near its outer edge which rides in channel 354. Rod 390 includes a downwardly extending leg 392 extending through the filter, as seen in FIGS. 50-53. The opposite lower end of the rod 390 also has a similar U-shaped end which extends in the lower channel 356 of lower guide track 330. Rod 390 thus supports and controls the outer end of the outer filter 380 as it is moved from a stored position, shown in FIG. 45, as it is incrementally moved, keeping the left outer end of filter 380 within track 350.

Filter 380 includes a U-shaped pin 400 at its inner end (i.e., toward the center of the unit as viewed in FIG. 49) which has a leg 402 which is fixedly positioned in recess 382 of filter 380. The opposite end of the U-shaped pin 400 includes a downwardly depending end 404 which rides within the upper channel 332 of track 330. The lower corner of filter 380 also has a similar pin with an end extending within a lower channel 334 of the lower tack 330. The filters 370 and 380 are spaced from one another by the U-shaped end of rod 390 and pins 400, which serve as guides to allow movement of the filters along tracks 330, 350 to move from a stored position (shown in FIG. 45) to use positions (shown in FIGS. 46-49). FIG. 52 illustrates the sequential movement of inner filter 370 between stored and use positions, it being understood that the right side filter 370 moves in tacks 340 and 360 in a similar manner.

Figure 54:
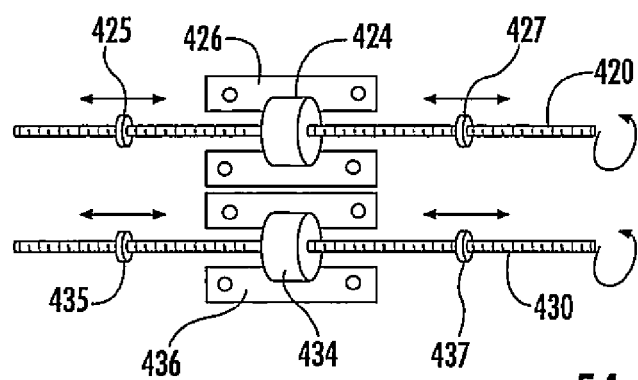
FIG. 54 is a partial schematic and pictorial view of the drive mechanism employed for moving the filters between stored and use positions.

The movement of filters 370 and 380 in upper and lower tracks 330 and 350 is accomplished by a drive mechanism which is coupled between the cabinet 312 of the air conditioner unit 310 and the inner facing edges of the left and right filters 370, 380, respectively. One manner in which this can be achieved is illustrated in FIGS. 53 and 54. Filter 370 is moved by the use of a first rotatable threaded screw drive 420, which is coupled to a suitable rotary drive, such as a rotary stepping motor 422. A bushing 424, as seen in FIG. 54, supports screw drive 420 and is secured to the cabinet by mounting bracket 426. A pair of thrust nuts 425 and 427 having left and right threads, respectively, are mounted to the rotatable threaded screw drive 420 and are coupled to the edges of left and right filters 370 by a yoke (not shown) or other suitable coupling. When rod 420 is rotated by drive 422, the thrust nuts move outwardly, pushing the filters 370 away from one another to a stowed position at the outer ends of tracks 330 and 340 and in guide tracks 350 and 360 (FIG. 45). The length of rod 420 and the threads are selected to achieve the desired amount of movement of filters 370 along tracks 330, 340, 350, and 360 to achieve the desired length of movement.

Similarly, the outer filters 380 are driven by a rotatable threaded screw drive 430 supported by bushing 434 to the cabinet using mounting brackets 436. Screw drive 430 is driven by a rotary drive 432. A pair of left and right threaded thrust nuts 435 and 437 move outwardly away from one another or toward one another depending on the rotational direction of rod 430 to move the outer filters 380, guided by tracks 330, 340, 350, and 360, between stored and use positions. The thrust nuts 425, 427, 435, and 437 are captively held to the filters by a suitable yoke mechanism mounted in vertically and horizontally spaced relationship to the inner facing edges of the respective filters. In some installations, the filter system of FIGS. 44-54 could be mounted to the outlet end 318 of unit 310. If the unit 310 were a vertically oriented system, the filters could likewise be used in a horizontally mounted position. In all embodiments, the upper and lower outwardly extending guide tracks 350 and 360 can be concealed in a suitable housing which is aesthetically acceptable and does not interfere.

It will become apparent to those skilled in the art that various modifications to the preferred embodiment of the The invention as described herein can be made without departing from the spirit or scope of the invention as defined by the appended claims.

The invention claimed is:

1. A split air conditioner system including an indoor mounted unit, said indoor unit comprising:
   a cabinet comprising cabinet sidewalk;
   an evaporator positioned within said cabinet;
   a fan positioned in said cabinet for moving air through said evaporator;
   an air inlet for admitting untreated air into said cabinet to allow said fan to move air from said air inlet through said evaporator;
   an outlet for discharging air from said cabinet; and
   a filter movably mounted to an outside surface of said cabinet in a flow path between said air inlet and said outlet for filtering air, said filter movable to be selectively positioned in the airflow path.

2. The air conditioner system of claim 1 further including an actuator coupled to the filter for moving the filter.

3. The air conditioner system of claim 2 further including a control circuit coupled to the actuator, the control circuit including one of an operator input and a sensor.

4. The air conditioner system of claim 3, wherein the control circuit includes a remote control having at least one of a particulate matter sensor or a hydrocarbon sensor.

5. The air conditioner system of claim 1, wherein the filter comprises at least one pair of filter panels, each mounted to the cabinet to move toward each other to an operative filtering position and away from each other to a non-filtering position.

6. The air conditioner system as defined in claim 5 wherein said at least one pair of filter panels are pivotally mounted to said cabinet.

7. The air conditioner system as defined in claim 1 wherein the filter is a first filter, and further including a second filter movably mounted to said cabinet to be selectively in the airflow path, said filter and second filter movable such that air moving through said cabinet is filtered by one of said filter, said second filter, or by both said first and second filters.

8. The air conditioner system as defined in claim 7 wherein said first filter and said second filter have different filtering characteristics.

9. The air conditioner system as defined in claim 1 wherein said filter comprises at least one segmented filter panel mounted to said cabinet to move to an operative filtering position and to a non-filtering position and further including first tracks mounted to said cabinet for guidably and movably receiving said at least one filter panel, said tracks extending in front of said air inlet and extending along said cabinet sidewalls.

10. The air conditioner system as defined in claim 9 wherein the filter is a first filter and further including a second segmented filter movably mounted to said second tracks overlying said first filter.

11. The air conditioner system of claim 10 further including a third segmented filter movably mounted to third tracks overlying the first and second filters.

12. The air conditioner system of claim 11 whereas each of the first, second, and third filters are independently movable between a non-filtering position and a selectively filtering position.

13. The air conditioner system as defined in claim 1 wherein said filter comprises at least one pair of filter panels, each mounted to said cabinet to move toward each other to an operative filtering position and away from each other to a non-filtering position and further including tracks mounted to said cabinet for guidably and movably receiving said at least one pair of filter panels, said tracks including first tracks extending in front of said air inlet and second tracks coupled to said first tracks and extending away from said cabinet.

14. The air conditioner system as defined in claim 13 and further including a second pair of filters movably mounted to said first and second tracks and overlying said at least one pair of filter panels.

15. The air conditioner system of claim 14, wherein the first and second tracks each include pairs of vertically aligned and spaced H-shaped tracks with opposed guide channels.

16. The air conditioner system of claim 15, wherein the first and second pairs of filters include U-shaped connector pins with ends that extend into the guide channels and space the first and second pairs of filters apart from one another.

17. The air conditioner system of claim 16 further including a motorized drive individually coupled to each filter of the first and second pairs of filters for independently moving the first and second pairs of filters between a non-filtering position in the second tracks and a selectively filtering position in the first tracks.

18. A split air conditioner system including an indoor mounted unit, the indoor unit comprising:
   a cabinet for mounting to a wall of a structure near the ceiling, the cabinet including an air inlet at the top and an air outlet at the bottom;
   an evaporator positioned within the cabinet;
   a fan positioned in the cabinet for admitting untreated air into the cabinet through the air inlet and discharging conditioned air from the outlet of the cabinet; and
   a filter positioned on an outside surface of the cabinet at the air inlet for selectively filtering air on non-filtering air.

19. The air conditioner system of claim 18, wherein the filter is movably mounted to the cabinet for movement between selectively filtering and non-filtering positions.

20. The air conditioner system of claim 19, wherein the filter is pivotally mounted to the air inlet.

21. The air conditioner system of claim 19, wherein the filter is linearly movable to the cabinet.

22. A split air conditioner system including an indoor mounted unit, the indoor unit comprising:
   a cabinet for mounting to a wall of a structure near the ceiling, the cabinet including an air inlet at the bottom and an air outlet at the top;
   an evaporator positioned within the cabinet;
   a fan positioned in the cabinet for admitting untreated air into the cabinet at the air inlet and discharging conditioned air from the outlet of the cabinet; and
   a filter positioned on an outside surface of the cabinet at the air inlet for selectively filtering air or non-filtering air.

23. The air conditioner system of claim 22, wherein the filter is movably mounted to the cabinet for movement between selective filtering and non-filtering positions.

24. The air conditioner system of claim 23, wherein the filter is pivotally mounted to the air inlet.

25. The air conditioner system of claim 23, wherein the filter is linearly movable toward and away from the cabinet to vary the amount of filtration.

26. The air conditioner system of claim 22, wherein the air outlet includes an adjustable vane.

27. A split air conditioner system including an indoor mounted unit, the indoor unit comprising:

a cabinet for mounting to a wall of a structure near the ceiling, the cabinet including an air inlet at the top and bottom and an air outlet facing the interior of the structure;

an evaporator positioned within the cabinet;

a fan positioned in the cabinet for admitting untreated air into the cabinet through the air inlet and discharging conditioned air from the outlet of the cabinet;

a filter having opposite edges, the filter pivotally mounted about a plurality of filter pivots in the cabinet at a location between the opposite edges of the filter and between the air inlet and the air outlet; and a control for pivoting the opposite edges of the filter toward and away from the evaporator for providing selective filtering and non-filtering admission of air from the top and bottom inlets.

28. The air conditioner system of claim 27, wherein the filter pivots to serve as a damper for allowing air to selectively bypass the filter.

29. A split air conditioner system including an indoor mounted unit, the indoor unit comprising:

a cabinet including an air inlet and an air outlet;

an evaporator positioned within the cabinet;

a fan positioned in the cabinet for admitting untreated air into the cabinet and discharging conditioned air from the outlet of the cabinet;

a filter positioned in the cabinet in a flow path between the air inlet and the outlet for selective filtering or non-filtering air; and a damper mounted to the cabinet for selectively bypassing the filter.

30. The air conditioner system of claim 29, wherein the damper is a sliding damper.

31. The air conditioner system of claim 29, wherein the damper is a rotary damper.

32. The air conditioner system of claim 31, wherein the system includes a centrifugal fan and further including baffles mounted in the cabinet to direct air through the centrifugal fan.

33. A split air conditioner system including an indoor mounted unit, said indoor unit comprising:

a cabinet;

an evaporator positioned within said cabinet;

a fan positioned in said cabinet;

an air inlet formed in said cabinet for drawing untreated air into said cabinet to allow said fan to move air from said air inlet through said evaporator;

an outlet for discharging air from said cabinet;

one of a filter or a stacked filter movably positioned in said cabinet in a flow path between said air inlet and said outlet for selectively filtering air; and at least one movable damper positioned in said cabinet for selectively changing the airflow path to selectively bypass said filter.

34. A method of operation of a split air conditioner system including an indoor mounted unit, said indoor unit comprising:

providing a cabinet;

providing an evaporator positioned within said cabinet;

providing a fan positioned in said cabinet;

providing an air inlet formed in said cabinet for drawing untreated air into said cabinet to allow said fan to move air from said air inlet through said evaporator;

providing an outlet for discharging air from said cabinet; and positioning one of a filter or a stacked filter, and a damper, in said cabinet in a flow path between said air inlet and said outlet for selectively filtering air and discharging of conditioned air to create a vertical thermal stratification within a conditioned space.

* * * * *